US012276155B2

(12) United States Patent
Kobayashi et al.

(10) Patent No.: US 12,276,155 B2
(45) Date of Patent: Apr. 15, 2025

(54) CONNECTING FITTING CONSTRUCTION MATERIALS AND CONNECTING METHOD THEREFOR

(71) Applicant: BUNKA SHUTTER CO., LTD., Tokyo (JP)

(72) Inventors: Masanori Kobayashi, Tokyo (JP); Shigeo Yamagami, Tokyo (JP); Katsuhiko Murakami, Tokyo (JP)

(73) Assignee: BUNKA SHUTTER CO., LTD., Tokyo (JP)

( * ) Notice: Subject to any disclaimer, the term of this patent is extended or adjusted under 35 U.S.C. 154(b) by 995 days.

(21) Appl. No.: 17/257,628

(22) PCT Filed: Jul. 2, 2019

(86) PCT No.: PCT/JP2019/026258
§ 371 (c)(1),
(2) Date: Jan. 26, 2022

(87) PCT Pub. No.: WO2020/009103
PCT Pub. Date: Jan. 9, 2020

(65) Prior Publication Data

US 2022/0220793 A1 Jul. 14, 2022

(30) Foreign Application Priority Data

Jul. 5, 2018 (JP) ................................ 2018-128166

(51) Int. Cl.
*E06B 1/02* (2006.01)
*E06B 1/52* (2006.01)
(Continued)

(52) U.S. Cl.
CPC .................. *E06B 1/02* (2013.01); *E06B 1/52* (2013.01); *E06B 1/6069* (2013.01); *E06B 3/9644* (2013.01)

(58) Field of Classification Search
CPC . E06B 1/02; E06B 1/52; E06B 1/6069; E06B 3/9644
(Continued)

(56) References Cited

U.S. PATENT DOCUMENTS 3,250,049 A * 5/1966 Sklar ..................... E06B 1/6061 52/211
3,571,996 A * 3/1971 Braswell ............... E06B 3/9885 49/505
(Continued)

FOREIGN PATENT DOCUMENTS

CN 2744811 Y 12/2005
CN 101498399 A 8/2009
(Continued)

OTHER PUBLICATIONS

Microfilm of the specification and drawings annexed to the request of Japanese Utility Model Application No. 119145/1971 (Laid-open No. 74432/1973) (Kimura, Yutaka) Sep. 17, 1973, entire text, in particular, specification, p. 1, lines 3-5, p. 2, lines 1-23, all drawings Reference JPS48-074432U (6 pages).
(Continued)

*Primary Examiner* — James J Buckle, Jr.
(74) *Attorney, Agent, or Firm* — Robert P. Michal, Esq.; Carter, DeLuca & Farrell LLP

(57) ABSTRACT

A connecting fitting for connecting two construction materials includes a first and second connecting members for connecting the construction materials, and a parallelizing means having a parallelizing function of aligning the connecting members in a first direction and making them parallel or almost parallel to each other. The first direction is a direction perpendicular to both the direction (M) of an interval between the two construction materials and the thickness direction of one construction material. The parallelizing function of the parallelizing means disappears due to
(Continued)

a load caused to act on at least one of the connecting members. The inclination angles of the connecting members with respect to the direction (M) of the interval become inclination angles (θ1, θ2) opposite to each other due to the disappearance of the parallelizing function.

13 Claims, 24 Drawing Sheets

(51) Int. Cl.
*E06B 1/60* (2006.01)
*E06B 3/964* (2006.01)

(58) Field of Classification Search
USPC ........................................................ 52/204.1
See application file for complete search history.

(56) References Cited

U.S. PATENT DOCUMENTS

| | | | | | |
|---|---|---|---|---|---|
| 3,585,770 | A * | 6/1971 | Maizler | E06B 1/6061 403/231 |
| 3,685,226 | A * | 8/1972 | Richter | E06B 1/603 49/505 |
| 4,128,977 | A * | 12/1978 | Schubeis | E06B 1/20 52/212 |
| 4,873,804 | A * | 10/1989 | Kukke | E06B 1/6076 411/116 |
| 5,655,343 | A * | 8/1997 | Seals | E06B 1/6069 52/745.15 |
| 8,806,812 | B2 * | 8/2014 | Kolovich | E06B 1/6046 52/126.4 |
| 10,246,886 | B2 * | 4/2019 | Mitchell | E04F 21/0015 |
| 11,746,585 | B2 * | 9/2023 | Kobayashi | E06B 1/52 52/215 |
| 2018/0187475 | A1 * | 7/2018 | Mitchell | E04F 21/0015 |

FOREIGN PATENT DOCUMENTS

| | | | |
|---|---|---|---|
| CN | 207749946 | U | 8/2018 |
| DE | 8400332 | U1 | 3/1984 |
| EP | 0969177 | A1 | 1/2000 |
| JP | S4854432 | U | 7/1973 |
| JP | S4874432 | U | 9/1973 |
| JP | S5079224 | U | 7/1975 |
| JP | S5214368 | Y | 3/1977 |
| JP | S547147 | B2 | 4/1979 |
| JP | S54182561 | U | 12/1979 |
| JP | S54182562 | U | 12/1979 |
| JP | S553904 | A | 1/1980 |
| JP | S56100671 | U | 8/1981 |
| JP | S56100672 | U | 8/1981 |
| JP | S56100684 | U | 8/1981 |
| JP | S56107069 | U | 8/1981 |
| JP | S5980082 | U | 5/1984 |
| JP | S5982184 | U | 6/1984 |
| JP | S59233085 | A | 12/1984 |
| JP | H06-010585 | U | 2/1994 |
| JP | H107229354 | A | 8/1995 |
| JP | 913800 | A | 1/1997 |
| JP | 09184397 | A | 7/1997 |
| JP | 2006307633 | A | 11/2006 |
| JP | 2012154084 | A | 8/2012 |
| JP | 2015071863 | A | 4/2015 |
| JP | 2015224482 | A | 12/2015 |
| JP | 2017115462 | A | 6/2017 |
| JP | 2017115463 | A | 6/2017 |
| JP | 2019011667 | A | 1/2019 |
| JP | 2020007748 | A | 1/2020 |
| KR | 10-2009-0008920 | A | 1/2009 |
| TW | M488540 | U | 10/2014 |

OTHER PUBLICATIONS

Microfilm of the specification and drawings annexed to the request of Japanese Utility Model Application No. 177815/1982 (Laid-open No. 82184/1984) (The Yamazaki Corporation) Jun. 2, 1984, entire text, all drawings Reference JPS59-082184U1 (11 pages).

Microfilm of the specification and drawings annexed to the request of Japanese Utility Model Application No. 134029/1973 (Laid-open No. 79224/1975) (Sankyo Aluminum Kogyo KK) Jul. 9, 1975, entire text, fig. 1-4, 6-10 Reference JPS50-079224U1 (12 pages).

International Search Report issued by the Japanase Patent Office acting as the International Searching Authority in relation to International Application No. PCT/JP2019/026258 dated Sep. 10, 2019 along with English language translation (4 pages).

Written Opinion of the International Searching Authority issued by the Japanase Patent Office acting as the International Searching Authority in relation to International Application No. PCT/JP2019/026258 dated Sep. 10, 2019 (5 pages).

International Preliminary Report on Patentability issued by the International Bureau of WIPO in relation to International Application No. PCT/JP2019/026258 dated Jan. 5, 2021 along with English language translation (15 pages).

Office Action issued by the China National Intellecutal Property Administration in relation to Chinese Application No. 201980045119.1 dated Jun. 1, 2022 (7 pages) along with English language translation (7 pages).

Search Report of TW Patent Application No. 109127359 dated Jul. 15, 2022 (1 page) along with English language translation (1 page).

Office Action issued by the The Intellectual Property Office Ministry of Economic Affairs, in relation to Taiwanese Application No. 109127359 dated Jul. 19, 2022 (6 pages) along with English language translation (4 pages).

Microfilm of Japanese Utility Model Application No. S46-119145.

Microfilm of Japanese Utility Model Application No. S46-97756.

Notice of Reasons for Refusal issued by the Japanese Patent Office in relation to Japanese Application No. 2020-122946 dated Mar. 15, 2022 (5 pages) along with English language translation (5 pages).

Notice of Reasons for Refusal issued by the Japanese Patent Office in relation to Japanese Application No. 2020-022040 dated Mar. 15, 2022 (4 pages) along with English language translation (4 pages).

Office Action issued by the China National Intellectual Property Administration, corresponding to Chinese Application No. 201980095214.2 dated Oct. 8, 2022 (8 pages) along with English translation (5 pages.

Extended European Search Report issued by the European Patent Office in relation to European Application No. 19 83 0020 dated Nov. 23, 2021 (10 pages).

Notice of Reasons for Refusal issued by the Japanese Patent Office in relation to Japanese Application No. 2020-122849 dated Mar. 8, 2022 (4 pages) along with English language translation (4 pages).

Notice of Reasons for Refusal issued by the Japanese Patent Office in relation to Japanese Application No. 2020-122848 dated Mar. 8, 2022 (6 pages) along with English language translation (5 pages).

Notice of Reasons for Refusal issued by the Japanese Patent Office in relation to Japanese Application No. 2020-122847 dated Mar. 8, 2022 (7 pages) along with English language translation (7 pages).

Microfilm of Japanese Utility Model Application No. S54-182564.

Microfilm of Japanese Utility Model Application No. S54-182561.

Microfilm of Japanese Utility Model Application No. S57-176414.

Notice of Reasons for Refusal issued by the Japanese Patent Office in relation to Japanese Application No. 2020-021530 dated Apr. 27, 2021 (3 pages) along with English language translation (3 pages).

Microfilm of the specification and drawings annexed to the request of Japanese Utility Model Application No. 119145/1971 (Laid-open No. 74432/1973) (Kimura, Yutaka) Sep. 17, 1973, entire text, all drawings.

Microfilm of the specification and drawings annexed to the request of Japanese Utility Model Application No. 11745/1986 (Laid-open No. 124184/1987) (Shin Nikkei Company, Ltd.) Aug. 6, 1987, entire text, all drawings (Family: none) English translation (26 pages).

Microfilm of the specification and drawings annexed to the request of Japanese Utility Model Application No. 86108/1978 (Laid-open

(56) References Cited

OTHER PUBLICATIONS

No. 4215/1980) (Mitsui Keikinzoku Kakou KK) Jan. 11, 1980, entire text, all drawings (Family: none) English translation (19 pages).
Notice of Reasons for Refusal issued by the Japanese Patent Office in relation to Japanese Application No. 2018-128166 dated Feb. 15, 2022 (4 pages) along with English language translation (4 pages).
Extended European Search Report issued by the European Patent Office in relation to European Application No. 19830876.9 dated Nov. 23, 2021 (8 pages).
Office Action issued by the Japanese Patent Office in relation to Japanese Application No. 2020-167423 dated Jul. 27, 2021 (4 pages) along with English language translation (4 pages).

* cited by examiner

CONNECTING FITTING CONSTRUCTION MATERIALS AND CONNECTING METHOD THEREFOR

TECHNICAL FIELD

The present invention relates to a connecting fitting for construction materials and a connecting method therefor, and more particularly, to a connecting fitting for construction materials and a connecting method therefor that can be used to connect two construction materials spaced apart from each other, more specifically, a construction material on the side of a skeleton such as a wall, and an apparatus-side construction material such as an opening frame, e.g., a door frame of a hinged door apparatus, a sliding door apparatus, or the like.

BACKGROUND ART

Patent literature 1 below discloses that a door frame, the inside of which is a doorway that is opened and closed by a hinged door, is arranged in a wall as a skeleton of a building.

RELATED ART LITERATURE

Patent Literature

Patent Literature 1: Japanese Utility Model Laid-Open No. 6-10585

DISCLOSURE OF INVENTION

Problem to be Solved by the Invention

The work for arranging an opening frame such as a door frame inside an opening formed in a wall includes a work for arranging the opening frame as a construction material for a hinged door with an interval from a skeleton-side construction material formed on the wall side, and connecting the skeleton-side construction material and the opening frame by using a connecting member. This connecting work is a work for attaching the opening frame to the skeleton-side construction material such that the opening frame is immobile.

It is an object of the present invention to provide a connecting fitting for construction materials and a connecting method therefor that can effectively perform the work for connecting two construction materials arranged with an interval therebetween even when this interval is small, and can render one construction material immobile with respect to the other construction material after the connecting work.

Means of Solution to the Problem

A connecting fitting for construction materials according to the present invention is a connecting fitting for construction materials, which connects two construction materials arranged with an interval therebetween, the connecting fitting including a first connecting member and a second connecting member that are inserted between the two construction materials, and function as members for connecting the two construction materials, and parallelizing means having a parallelizing function of aligning the first connecting member and the second connecting member in a first direction perpendicular to both a thickness direction of one of the two construction materials and a direction of the interval, and making the first connecting member and the second connecting member parallel or almost parallel to each other, wherein the parallelizing means can eliminate the parallelizing function by a load caused to act on at least one of the first connecting member and the second connecting member, and inclination angles, with respect to the direction of the interval, of the first connecting member and the second connecting member aligned parallel or almost parallel to each other in the first direction by the parallelizing means can be made opposite to each other by the elimination of the parallelizing function.

In the connecting fitting for construction materials according to the present invention, when the first and second connecting members are inserted between two construction materials, the parallelizing function of the parallelizing means makes these connecting members parallel or almost parallel in the first direction. Even when the interval between the two construction materials is small, therefore, the first and second connecting members can sufficiently be inserted into this interval.

Also, after the first and second connecting members are inserted between the two construction materials, the parallelizing function of the parallelizing means disappears, and this makes the inclination angles of the connecting members with respect to the direction of the interval opposite to each other. In this state, the two construction materials can be connected by the first and second connecting members. Accordingly, one of the two construction materials can be rendered immobile in the first direction with respect to the other construction material.

In the connecting fitting for construction materials according to the present invention as described above, the parallelizing function of the parallelizing means makes the first and second connecting members parallel or almost parallel in the first direction. In addition, after these connecting members are inserted between two construction materials, the inclination angles of these connecting members with respect to the direction of the interval between the two construction materials are made opposite to each other. This can be implemented by inserting a central shaft having an axial direction in the thickness direction of one of the two construction materials into one of the two end portions of each of the first and second connecting members, and making the first and second connecting members pivotable around this central shaft.

This central shaft may also be used for each of the first and second connecting members. In this case, two central shafts are used. It is also possible to use one central shaft common to the first and second connecting members. The use of one central shaft common to the first and second connecting members can reduce the number of members and the manufacturing cost by the use of a common member.

Also, the parallelizing means can be an arbitrary means provided that the means has the parallelizing function that aligns the first and second connecting members in the first direction and makes them parallel or almost parallel to each other, and that this parallelizing function can disappear due to a load acting on at least one of the first and second connecting members. One example of this parallelizing means is a projecting piece that is formed in at least one of the first and second connecting members, projects toward the other connecting member, and is in contact with the other connecting member. It is only necessary to make this projecting piece bendable by the load acting on at least one of the first and second connecting members, and eliminate the parallelizing function by this bending.

Another example of the parallelizing means is a frictional means interposed between the first and second connecting members. The frictional force of this frictional means acts as the parallelizing function, and makes it possible to align the first and second connecting members in the first direction and make them parallel or almost parallel to each other. Also, this parallelizing means is so configured that the parallelizing function disappears when a load larger than the frictional force acts on at least one of the first and second connecting members, and the inclination angles of the first and second connecting members with respect to the direction of the interval between the two construction materials are made opposite to each other.

Still another example of the parallelizing means is a projection/recess means including a recess formed in one of the first and second connecting members, and a projection that is formed in the other connecting member and detachably fits in the recess. When the projection fits in the recess, the parallelizing function arises, so the first and second connecting members can be aligned in the first direction and made parallel or almost parallel to each other. In addition, the parallelizing means is so configured that when the abovementioned load acts on at least one of the first and second connecting members, the parallelizing function disappears because the projection escapes from the recess, and the inclination angles of the first and second connecting members with respect to the direction of the interval between the two construction materials are made opposite to each other.

When using the above-described projecting piece as the parallelizing means, it is also possible to form a strength decreasing portion having low strength in that portion of one connecting member, which is close to the projecting piece, and make the projecting piece bendable with a small load by this strength decreasing portion.

Since, therefore, the projecting piece can easily be bent from the strength decreasing portion by a small load acting on one connecting member, an operation can easily be performed on one connecting member in order to eliminate the parallelizing function of the parallelizing means.

Note that the strength decreasing portion can be an arbitrary portion as long as the portion decreases the strength of one connecting member. An example of the strength decreasing portion is a notch formed in one connecting member. Another example of the strength decreasing portion is a thin portion formed in one connecting member.

It is also possible to form two strength decreasing portions on the two sides of the projecting piece. The two strength decreasing portions can make the projecting piece bendable by a smaller load.

A connecting method for construction materials according to the present invention is a connecting method for construction materials, which connects two construction materials arranged with an interval therebetween, the connecting method including a first working step of aligning a first connecting member and a second connecting member in a direction perpendicular to both a thickness direction of one of the two construction materials and a direction of the interval, and making the first connecting member and the second connecting member parallel or almost parallel to each other, by a parallelizing function of parallelizing means formed in at least one of the first connecting member and the second connecting member, and inserting the first connecting member and the second connecting member between the two construction materials in this state, a second working step of making inclination angles of the first connecting member and the second connecting member with respect to the direction of the interval opposite to each other by elimination of the parallelizing function of the parallelizing means, after the first working step, and a third working step of connecting the two construction materials by the first connecting member and the second connecting member, after the second working step.

In the first working step of this connecting method for construction materials, the first and second connecting members are inserted between two construction materials in a state in which the first and second connecting members are aligned in the first direction and made parallel or almost parallel to each other by the parallelizing function of the parallelizing means. Even when the interval between these construction materials is small, therefore, the first and second connecting members can sufficiently be inserted into this interval.

Also, in the second working step after the first and second connecting members are inserted between the two construction materials, the parallelizing function of the parallelizing means disappears, so the inclination angles of the first and second connecting members with respect to the direction of the interval between the two construction materials become opposite to each other. In this state, the first and second connecting members connect the two construction materials in the third working step. This can render one of the two construction materials immobile in the first direction with respect to the other construction material.

Two construction materials to be connected by the connecting fitting for construction materials and the connecting method therefor according to the present invention explained above can be arbitrary construction materials. One example of these construction materials includes a skeleton-side construction material such as a wall, and an opening frame arranged to oppose this construction material in the horizontal direction. This opening frame can be any of a door frame for a hinged door apparatus, an opening frame for a sliding door apparatus, and an opening frame for a passing opening to be formed in a wall. Also, one of the two construction materials can be a door case for accommodating a fire door that is normally opened from a door frame. In addition, the connecting fitting for construction materials and the connecting method therefor according to the present invention can also be used to connect two construction materials such as pillars including a middle pillar of a building, beams, crossbars, and face plates, that is, the present invention is applicable to arbitrary construction materials.

Furthermore, the connecting fitting for construction materials and the connecting method therefor according to the present invention are applicable to construction materials to be newly formed in a structure such as a building, and are also applicable to construction materials to be repaired.

Effect of the Invention

The present invention achieves the effect of effectively performing the work for connecting two construction materials arranged with an interval therebetween even when this interval is small, and rendering one construction material immobile with respect to the other construction material after the connecting work.

BEST MODE FOR CARRYING OUT THE INVENTION

Figure 1:
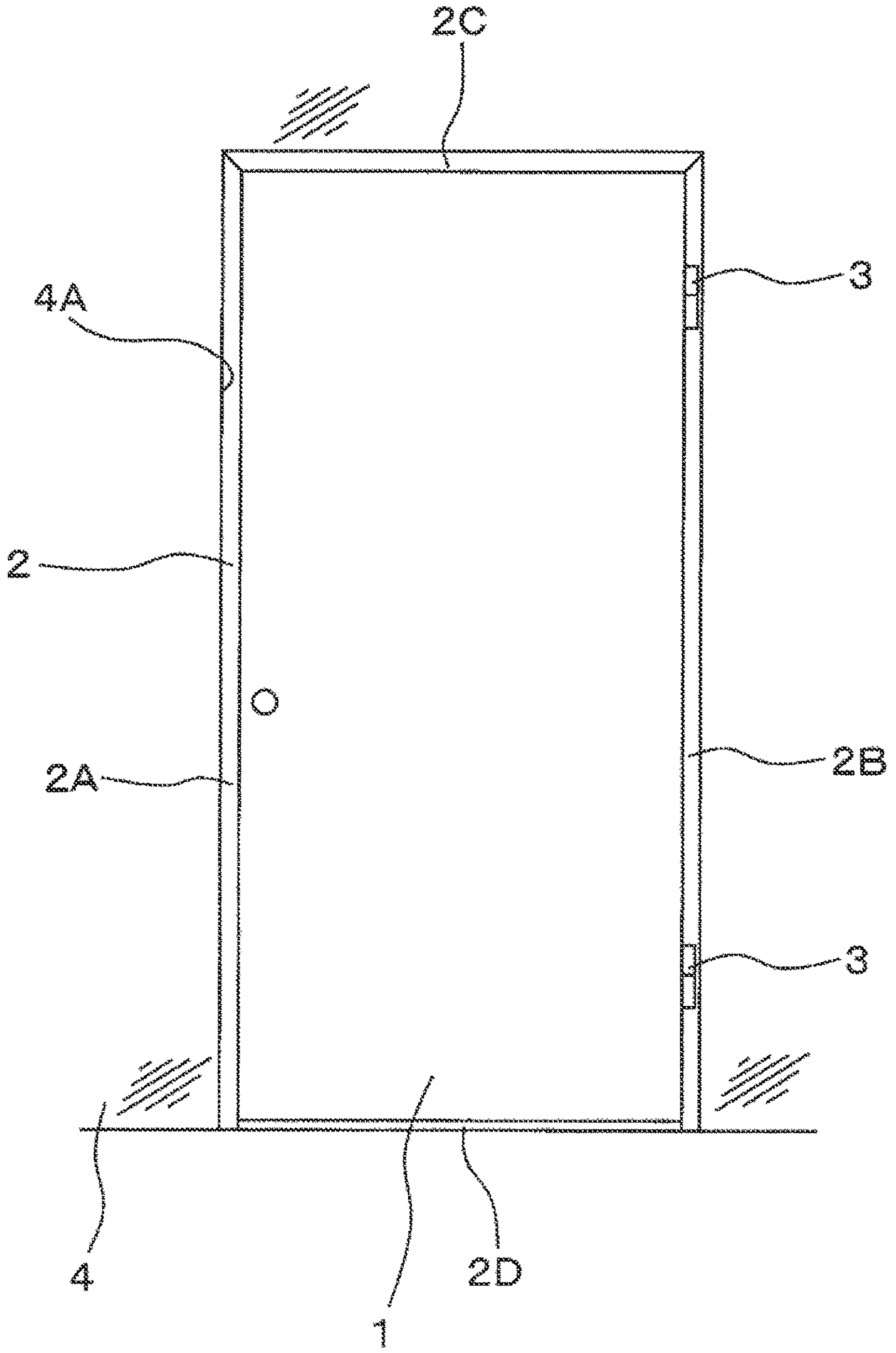
FIG. 1 is a whole front view of a hinged door apparatus to which a connecting fitting for construction materials according to an embodiment of the present invention is applied.
Figure 2:
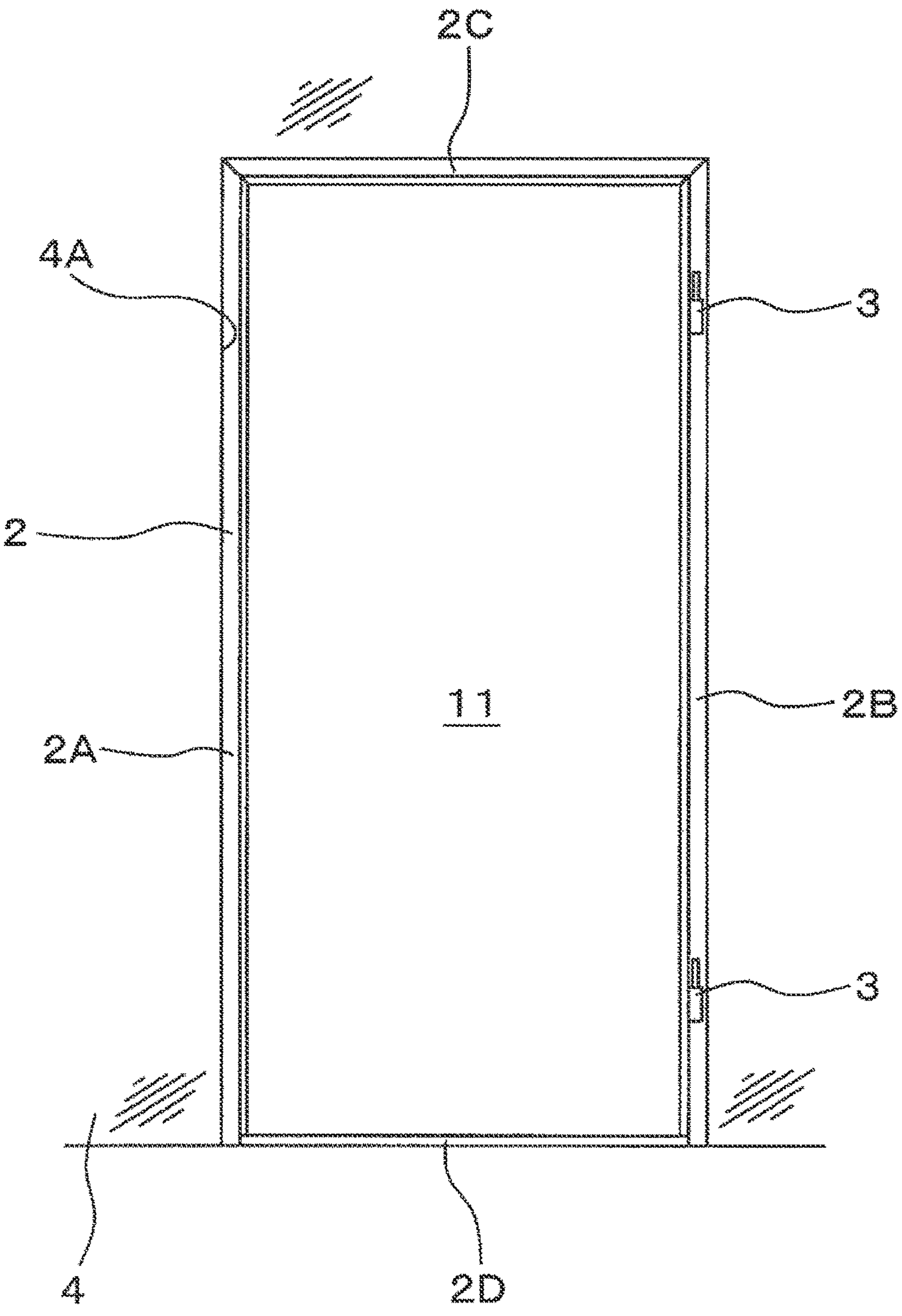
FIG. 2 is a whole front view showing a door frame as a construction material on the side of the hinged door apparatus.

A mode for carrying out the present invention will be explained below with reference to the accompanying drawings. FIG. 1 shows a whole front view of a hinged door apparatus. In this hinged door apparatus, a hinged door 1 is attached to a door frame 2 so as to be pivotal around hinges 3, and the door frame 2 is arranged inside an opening 4A formed in a wall 4 as a building skeleton. FIG. 2 shows the door frame 2 before the hinged door 1 is attached. As shown in FIG. 2, the door frame 2 is an opening frame as a doorway 11 the inside of which is opened and closed by the hinged door 1. Since the door frame 2 of this embodiment is a four-side frame, the door frame 2 includes left and right side frame members 2A and 2B, an upper frame member 2C, and a lower frame member 2D as a doorsill member. The frame members 2A, 2B, 2C, and 2D are welded in a factory beforehand, and transported to the construction site of a structure such as a building in which the hinged door apparatus is installed.

Note that the door frame 2 may also be a three-side frame having no lower frame member 2D.

Figure 3:
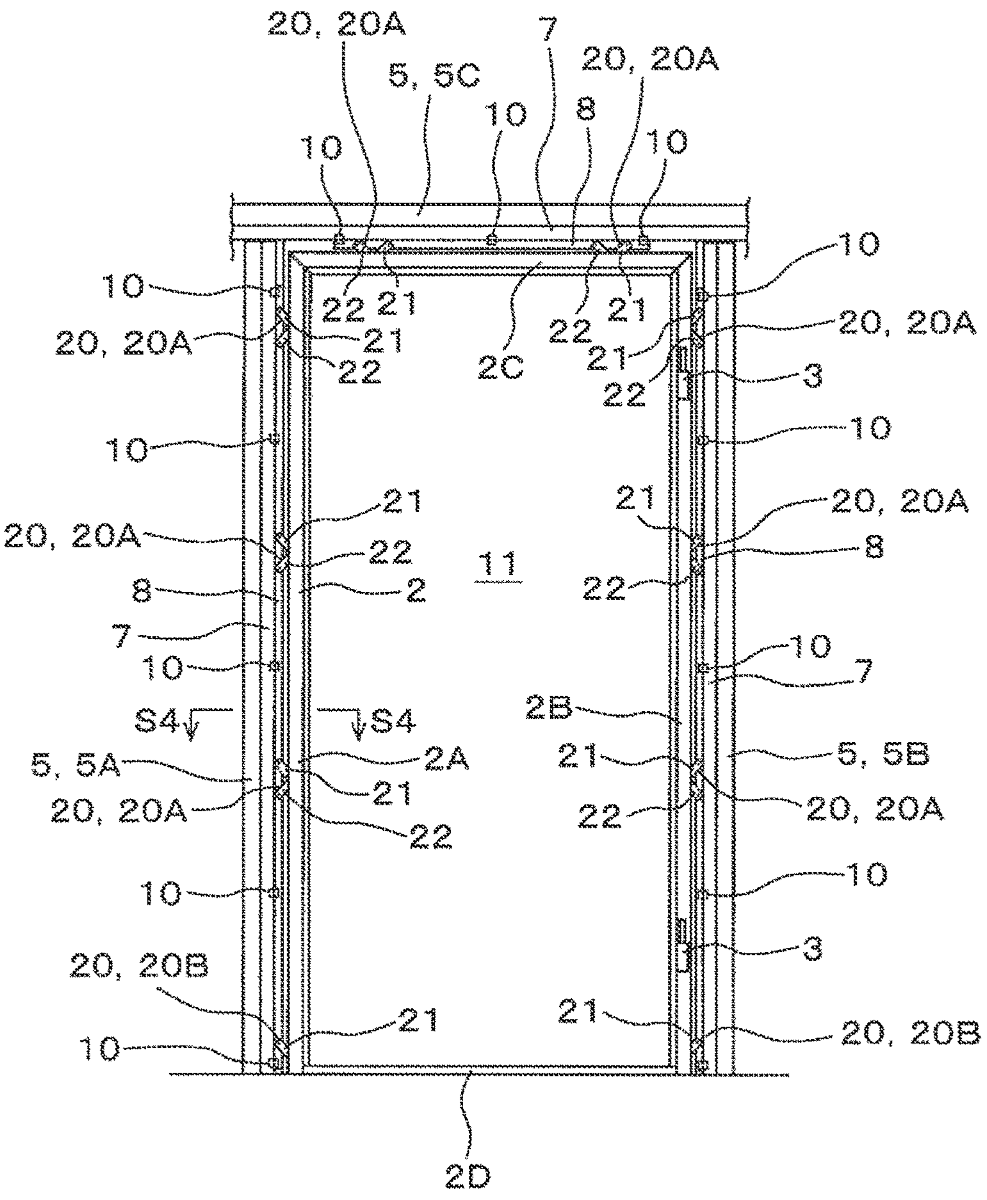
FIG. 3 is a whole front view showing a structure in which first and second connecting fittings connect a door frame and a reinforcing member as a skeleton-side construction material via an auxiliary member attached to the reinforcing member.
Figure 4:
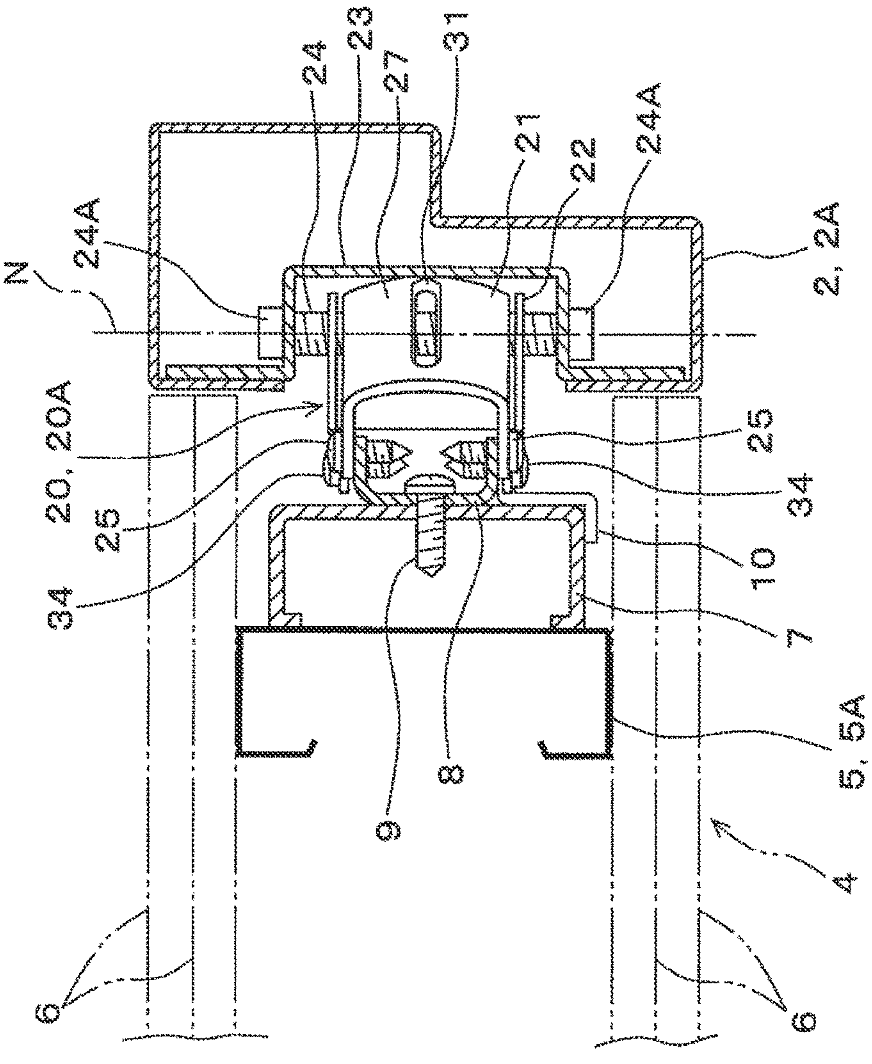
FIG. 4 is a sectional view taken along a line S4-S4 shown in FIG. 3.

FIG. 3 shows a state in which the door frame 2 is arranged in the wall 4 shown in FIGS. 1 and 2. FIG. 4 is a sectional view taken along a line S4-S4 shown in FIG. 3. As shown in FIG. 4, the wall 4 shown in FIGS. 1 and 2 is a building skeleton formed by fixing face plates 6 such as plaster boards on both the front and rear surfaces of core members 5. The door frame 2 is arranged inside the opening 4A shown in FIGS. 1 and 2 formed in the wall 4. Of a large number of core members 5 formed inside the wall 4, FIG. 3 shows core members 5A and 5B arranged in portions opposing, in the horizontal direction, the left and right side frame members 2A and 2B of the door frame 2, and a core member 5C arranged in a portion opposing the upper frame member 2C of the door frame 2 in the vertical direction.

Before the work for arranging the door frame 2 inside the opening 4A of the wall 4, reinforcing members 7 shown in FIGS. 3 and 4 are coupled with the core members 5A, 5B, and 5C in advance. Also, an auxiliary member 8 is attached to each reinforcing member 7 by a fixing fitting 9 shown in FIG. 4. A crank-shaped positioning member 10 is coupled with each auxiliary member 8. After each positioning member 10 is brought into contact with one of the two surfaces of the reinforcing member 7 in the thickness direction of the door frame 2 (the thickness direction of the hinged door 1 and the wall 4), the auxiliary member 8 is attached to the reinforcing member 7 by the fixing fitting 9. Consequently, each auxiliary member 8 is set in a predetermined position in the thickness direction of the door frame 2 and attached to the reinforcing member 7.

In the above explanation, the core member 5, the reinforcing member 7, and the auxiliary member 8 are members of the wall 4 as a building skeleton, so the core member 5, the reinforcing member 7, and the auxiliary member 8 are skeleton-side construction materials. On the other hand, the hinged door 1 and the door frame 2 are members of the hinged door apparatus to be installed in the wall 4, so the hinged door 1 and the door frame 2 are hinged door apparatus-side construction materials.

Figure 5:
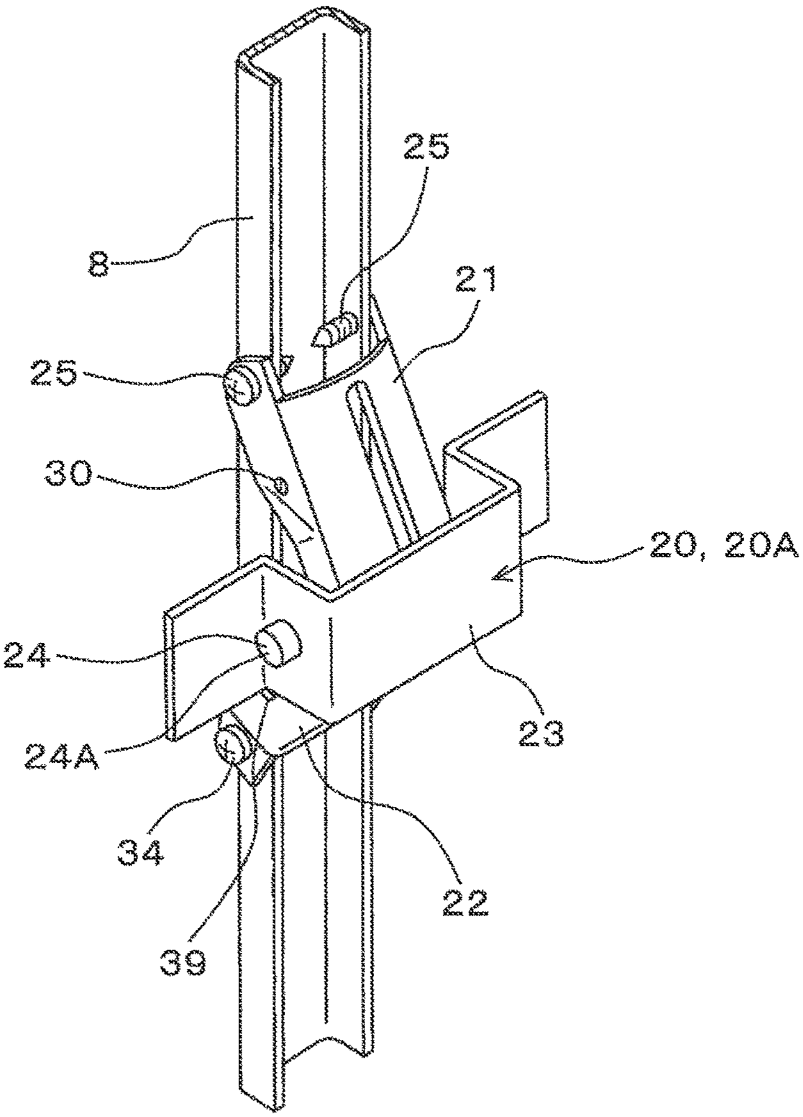
FIG. 5 is a perspective view showing the whole first connecting fitting shown in FIG. 3 by including the auxiliary member shown in FIGS. 3 and 4.
Figure 6:
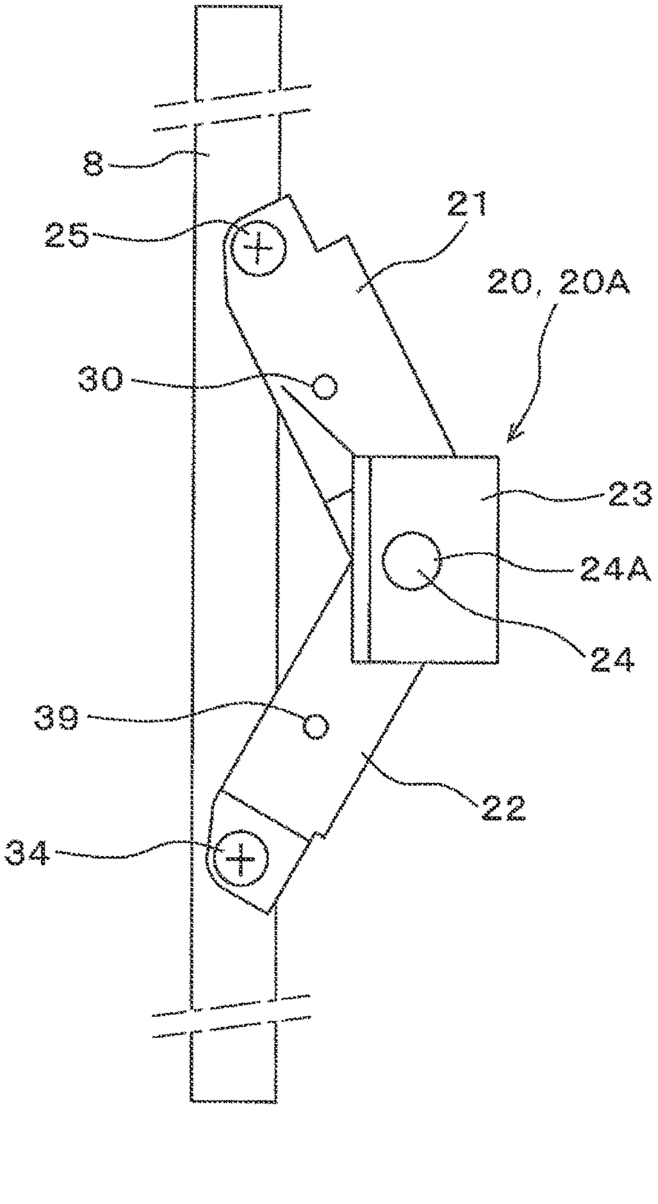
FIG. 6 is a front view of FIG. 5.

FIG. 3 shows a state in which after the work for arranging the door frame 2 inside the opening 4A of the wall 4 is performed, the door frame 2 is connected to the reinforcing member 7 via the auxiliary member 8 by using a connecting fitting 20. A plurality of connecting fittings 20 are formed for each of the left and right side frame members 2A and 2B and the upper frame member 2C of the door frame 2, and connect the door frame 2 to the reinforcing members 7 via the auxiliary members 8. As the connecting fittings 20, a plurality of first connecting fittings 20A and two second connecting fittings 20B are used. The first connecting fitting 20A includes first and second connecting members 21 and 22, whereas the second connecting fitting 20B includes the first connecting member 21 but does not include the second connecting member 22. The plurality of first connecting fittings 20A have the same shape and the same structure. Therefore, FIGS. 5 and 6 illustrate, as a typical example of the plurality of first connecting fittings 20A shown in FIG. 3, the first connecting fitting 20A that is arranged on the side frame member 2A of the door frame 2 shown in FIG. 4 and connects the side fame member 2A to the auxiliary member 8 attached to the reinforcing member 7 coupled with the core member 5A described earlier. FIGS. 5 and 6 do not show the side frame member 2A.

Note that the two second connecting fittings 20B shown in FIG. 3 also have the same shape and the same structure. As shown in FIG. 3, the second connecting fittings 20B are arranged below the plurality of first connecting fittings 20A vertically arranged on each of the left and right side frame members 2A and 2B.

FIG. 5 shows a perspective view of the first connecting fitting 20A by including the auxiliary member 8. FIG. 6 is a front view of FIG. 5. As is also shown in FIG. 4, the first connecting fitting 20A includes a bearing member 23 formed into the shape of a hat, a central shaft 24 supported by the bearing member 23, and the first and second connecting members 21 and 22 described above. The thickness direction of the door frame 2 is an axial direction N of the central shaft 24, and the two end portions in the axial direction N function as retaining portions 24A and retain the central shaft 24. As shown in FIG. 4, the central shaft 24 is inserted, as an insertion member common to the first and second connecting members 21 and 22, through the end portions, on the side of the door frame 2, of the first and second connecting members 21 and 22. The first and second connecting members 21 and 22 can freely pivot around the central shaft 24. Also, the end portion, on the side of the wall 4, of the first connecting member 21 is coupled with the auxiliary member 8 by coupling fittings 25 as self-drill screws. Likewise, the end portion, on the side of wall 4, of the second connecting member 22 is coupled with the auxiliary member 8 by coupling fittings 34 as self-drill screws.

FIGS. 7A, 7B, 7C, and 7D depict the first connecting member 21. FIGS. 7A, 7B, 7C, and 7D are respectively a plan view, a side view, a bottom view, and a rear view of the first connecting member 21. The first connecting member 21 is a product obtained by punching and bending a metal plate. The first connecting member 21 includes two connecting parts 26 opposing each other. The two connecting parts 26 are separated from each other in the axial direction N of the central shaft 24, and coupled with each other by a bridge part 27 for which the axial direction N of the central shaft 24 is the widthwise dimension. The bridge part 27 is bridged between the end portions of the two connecting parts 26, on the side of the thickness direction of the whole first connecting member 21 perpendicular to the axial direction N of the central shaft 24. Also, assuming that a direction perpendicular to the axial direction N of the central shaft 24 and perpendicular to the thickness direction of the whole first connecting member 21 is the longitudinal direction of each connecting part 26, the dimension of each connecting part 26 in the longitudinal direction is a dimension by which two end portions 26A and 26B of the connecting part 26 in the longitudinal direction reach the door frame 2 and the auxiliary member 8 as the skeleton of the wall 4.

Figure 7A:
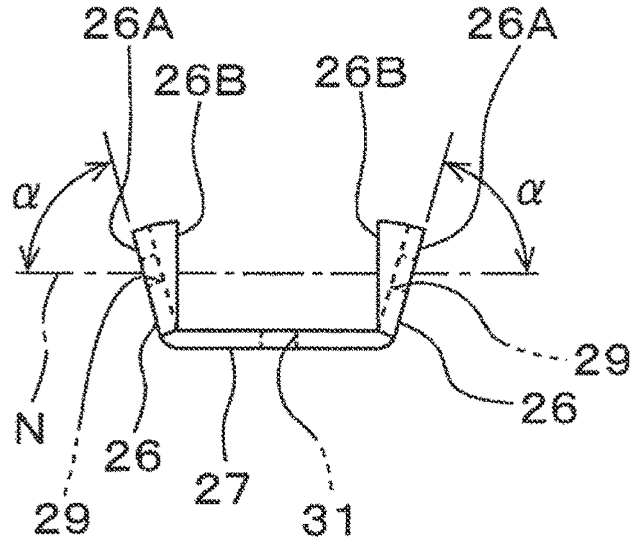
FIG. 7A is a plan view showing a first connecting member as a constituting member of the first and second connecting fittings.
Figure 7B:
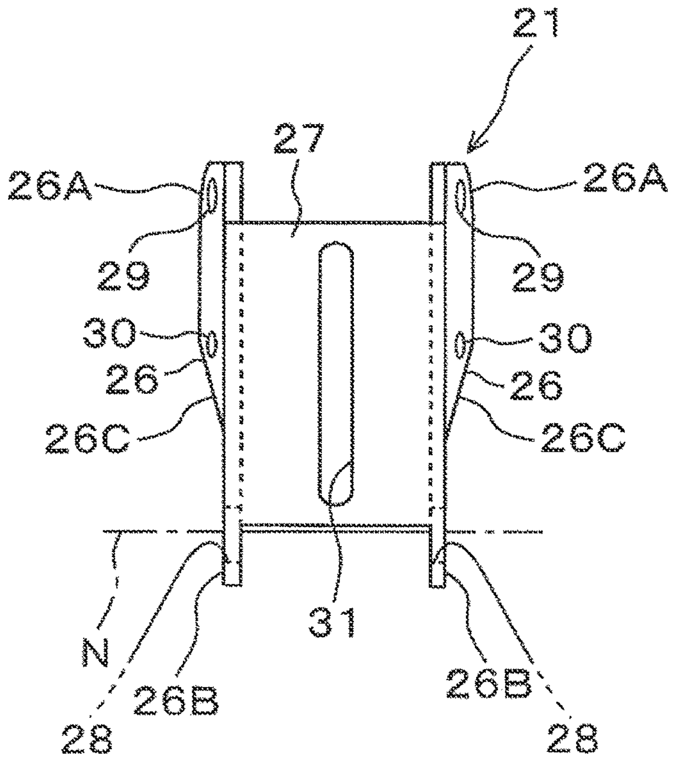
FIG. 7B is a side view of FIG. 7A.
Figure 7C:
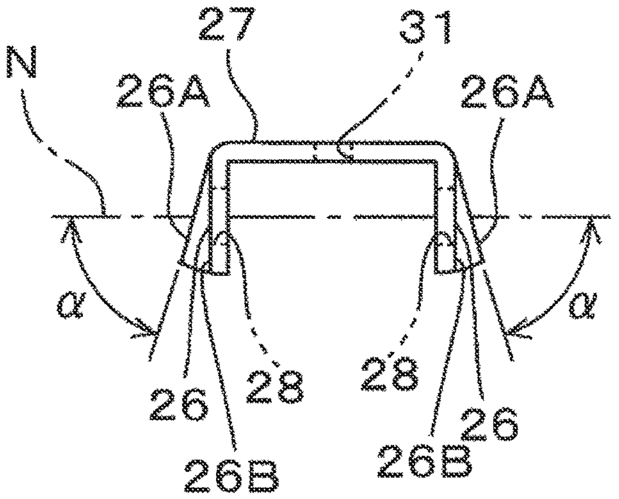
FIG. 7C is a bottom view of FIG. 7A.
Figure 7D:
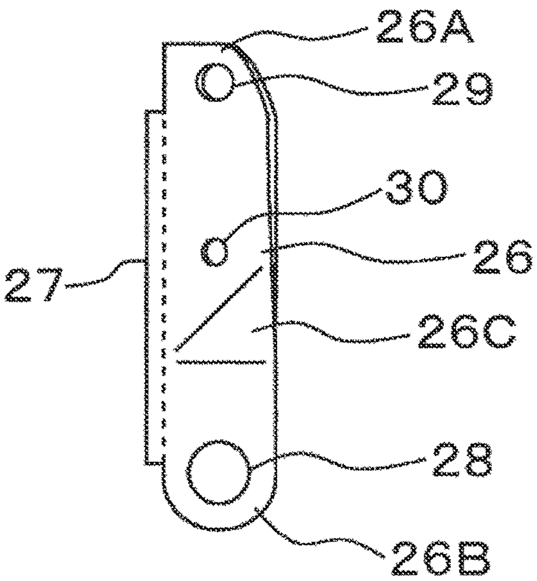
FIG. 7D is a rear view of FIG. 7A.

As shown in FIGS. 7A and 7C, the end portion 26A, on the side of the auxiliary member 8, of the two end portions 26A and 26B of each connecting part 26 in the longitudinal direction has a torsion angle (90°-α) as an angle inclining to the outside of the first connecting member 21 with respect to a direction perpendicular to the axial direction N of the central shaft 24. The torsion angles (90°-α) of the two connecting parts 26 are torsion angles in directions opposite to each other. On the other hand, as shown in FIGS. 7A and 7C, the end portion 26B on the side of the door frame 2 has no such torsion angle as described above. A portion between the end portions 26A and 26B is an intermediate portion 26C for gradually eliminating the torsion angle (90°-α). The end portion 26B on the side of the door frame 2 has a first hole 28 having a large diameter, as an insertion portion for inserting the central shaft 24, and the end portion 26A on the side of the auxiliary member 8 has a small-diameter second hole 29 for inserting the coupling fitting 25 shown in FIG. 4. The connecting parts 26 also have third holes 30 for inserting coupling fittings 50 and 51 to be described later with reference to FIGS. 19 and 20, within the range in which the above-described torsion angle (90°-α) exists.

Furthermore, the bridge part 27 has an elongated hole 31. The elongated hole 31 is elongated in the longitudinal direction of the connecting part 26, and functions as a strength decreasing portion formed in the bridge part 27 in order to decrease the strength of the bridge part 27.

As described above, the first connecting member 21 is formed by the two connecting parts 26 and the bridge part 27 bridged between the connecting parts 26, and the section perpendicular to the longitudinal direction is an almost U-shaped section. However, the end portions 26A, on the side of the auxiliary member 8, of the two connecting parts 26 open to the outside of the first connecting member 21 due to the torsion angles (90°-α) described above. In other words, the end portions 26A form an inverted V-shape that opens outward in the axial direction N of the central shaft 24.

Figure 8A:
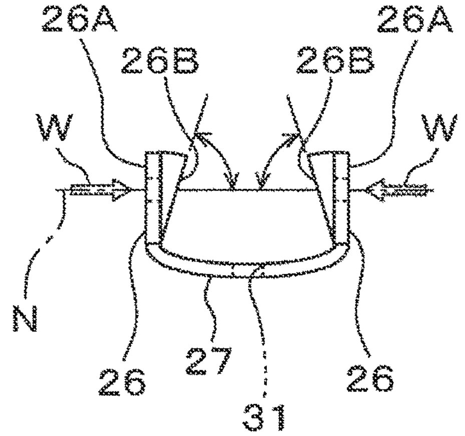
FIG. 8A is a plan view showing the first connecting member when loads act.
Figure 8B:
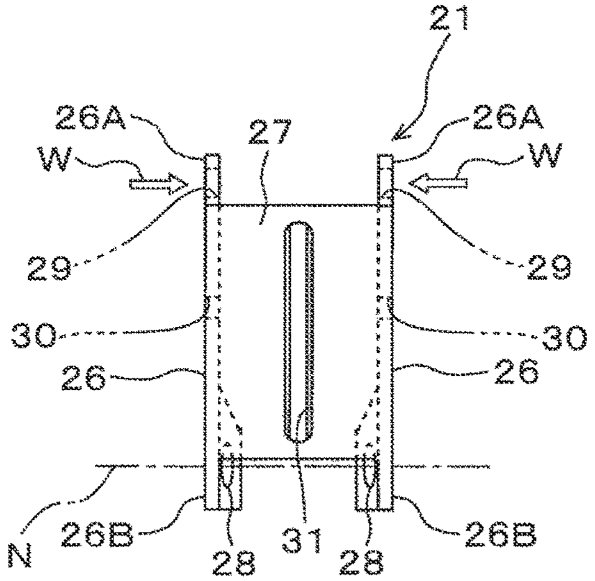
FIG. 8B is a side view of FIG. 8A.
Figure 8C:
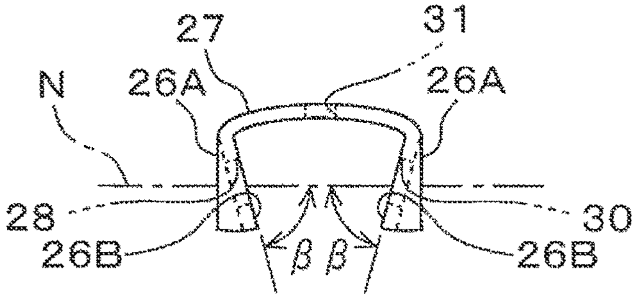
FIG. 8C is a bottom view of FIG. 8A.

FIGS. 8A, 8B, and 8C depict a state in which loads W in directions opposite to each other in the axial direction N of the central shaft 24 act on the end portions 26A, on the side of the auxiliary member 8, of the connecting parts 26. A state like this occurs when the coupling fitting 25 shown in FIG. 4 couples the end portions 26A, on the side of the auxiliary member 8, of the connecting parts 26, with the auxiliary member 8. When the loads W as described above act on the end portions 26A on the side of the auxiliary member 8, the torsion angles (90°-α) shown in FIGS. 7A and 7C of the end portions 26A on the side of the auxiliary member 8 reduce or disappear, and the influence of the loads W deforms, e.g., curves the bridge part 27 in a direction projecting to the outside of the first connecting member 21, in the thickness direction of the bridge part 27 (the thickness direction of the whole first connecting member 21). The influence of the loads W also generates torsion angles (90°-β) as angles inclining to the inside of the first connecting member 21 with respect to a direction perpendicular to the axial direction N of the central shaft 24, on the end portions 26B on the side of the door frame 2, which are connected to the end portions 26A on the side of the auxiliary member 8 via the intermediate portion 26C. The torsion angles (90°-β) are torsion angles in directions opposite to each other with respect to the end portions 26B on the side of the door frame 2.

In the whole first connecting member 21, therefore, the shape formed by the end portions 26B, on the side of the door frame 2, of the two connecting parts 26 is a V-shape that closes to the inside of the first connecting member 21 due to the torsion angles (90°-β).

Note that the elongated hole 31 is formed in the bridge part 27 and decreases the strength of the bridge part 27, so the bridge part 27 is easily deformed, e.g., curved as described above, due to the loads W. Accordingly, the reduction or elimination of the torsion angles (90°-α) of the end portions 26A on the side of the auxiliary member 8 and the generation of the torsion angles (90°-β) of the end portions 26B on the side of the door frame 2 occur more reliably.

Figure 9A:
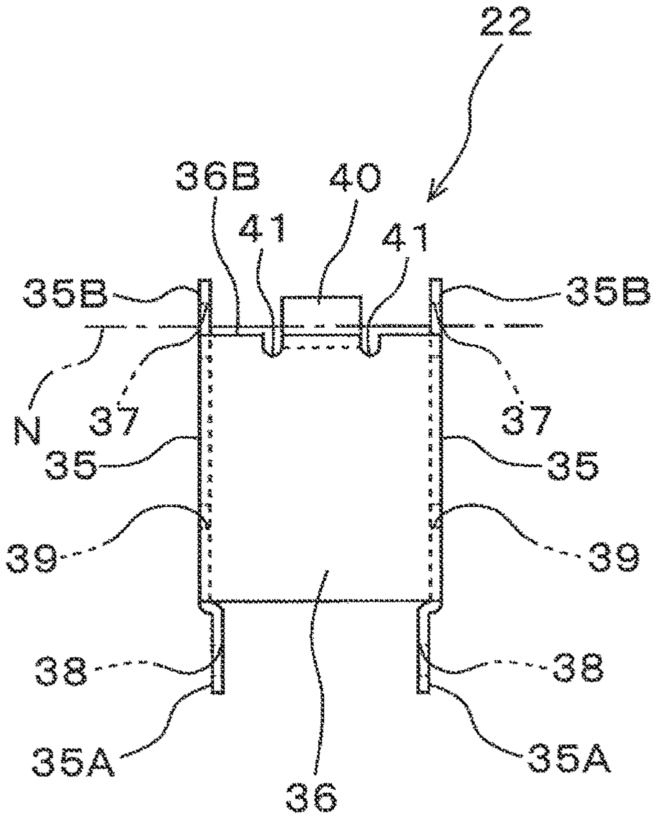
FIG. 9A is a side view showing a second connecting member as a constituting member of the first connecting fitting.
Figure 9B:
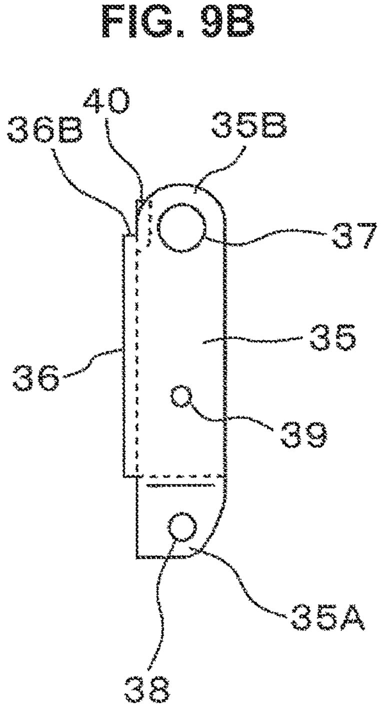
FIG. 9B is a rear view of FIG. 9A.

FIGS. 9A and 9B show the second connecting member 22. FIGS. 9A and 9B are respectively a side view and a rear view of the second connecting member 22. Like the first connecting member 21, the second connecting member 22 is a product obtained by punching and bending a metal plate. The second connecting member 22 also includes two connecting parts 35 opposing each other. The two connecting parts 35 are separated from each other in the axial direction N of the central shaft 24, and coupled with each other by a bridge part 36 for which the axial direction N of the central shaft 24 is the widthwise dimension. The bridge part 36 is bridged between the end portions of the two connecting parts 35, on the side of the thickness direction of the whole second connecting member 22 perpendicular to the axial direction N of the central shaft 24. Also, assuming that a direction perpendicular to the axial direction N of the central shaft 24 and perpendicular to the thickness direction of the whole second connecting member 22 is the longitudinal direction of each connecting part 35, the dimension of each connecting part 35 in the longitudinal direction is a dimension by which two end portions 35A and 35B of the connecting part 35 in the longitudinal direction reach the door frame 2 and the auxiliary member 8 as the skeleton of the wall 4.

Also, of the two end portions 35A and 35B in the longitudinal direction of each connecting part 35, the end portion 35A on the side of the auxiliary member 8 slightly bends toward the inside of the second connecting member 22 with respect to the end portion 35B on the side of the door frame 2. Of the end portions 35A and 35B, the end portion 35B on the side of the door frame 2 has a first hole 37 having a large diameter, as an insertion portion for inserting the central shaft 24, and the end portion 35A on the side of the auxiliary member 8 has a second hole 38 having a small diameter, as an insertion portion for inserting the coupling fitting 34 shown in FIG. 4. In addition, the connecting parts 35 have third holes 39 for inserting the coupling fittings 50 and 51 to be described later with reference to FIGS. 19 and 20.

Furthermore, the end portion 36B, on the side of the door frame 2, of the bridge part 36 has a projecting piece 40 that projects toward the central shaft 24, in other words, projects toward the first connecting member 21. The end portion 36B of the bridge part 36 has notches 41 in portions close to the projecting piece 40. In the end portion 36B of this embodiment, two notches 41 are formed on the two sides of the projecting piece 40. Note that as shown in FIG. 9B, the projecting piece 40 of this embodiment is so formed as to slightly bend from the bridge part 36 to the inside of the second connecting member 22 in the thickness direction.

The projecting piece 40 formed in the second connecting member 22 as described above can be bent in the thickness direction of the whole second connecting member 22 if a load acts on the projecting piece 40 in this thickness direction. The two notches 41 of the end portion 36B of the bridge part 36, which are formed on the two sides of the projecting piece 40, function as strength decreasing portions for decreasing the strength of the proximal end portion of the projecting piece 40 in the bridge part 36. Therefore, the projecting piece 40 can easily be bent even if the above-mentioned load acting on the projecting piece 40 is small.

Figure 10:
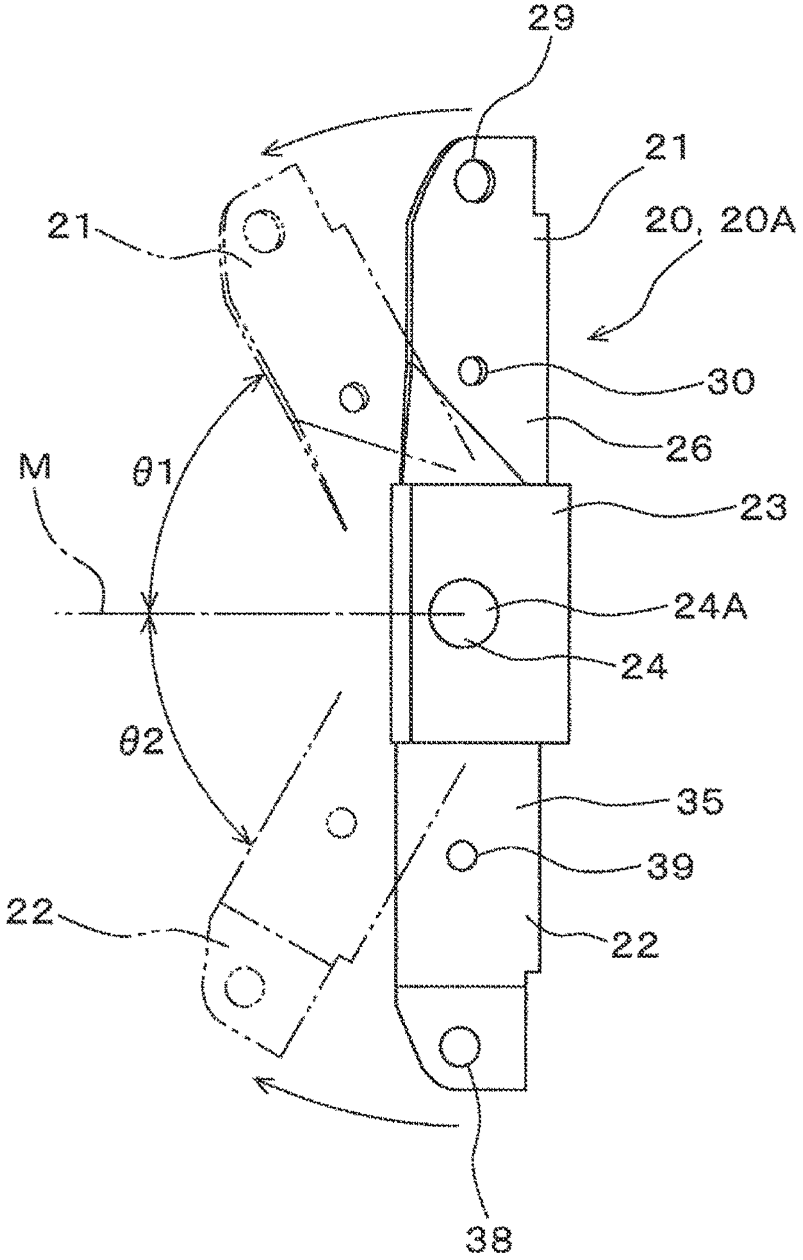
FIG. 10 is a front view showing, by the solid lines, a state in which the first and second connecting members of the first connecting fitting shown in FIGS. 5 and 6 are parallel or almost parallel to each other.
Figure 11:
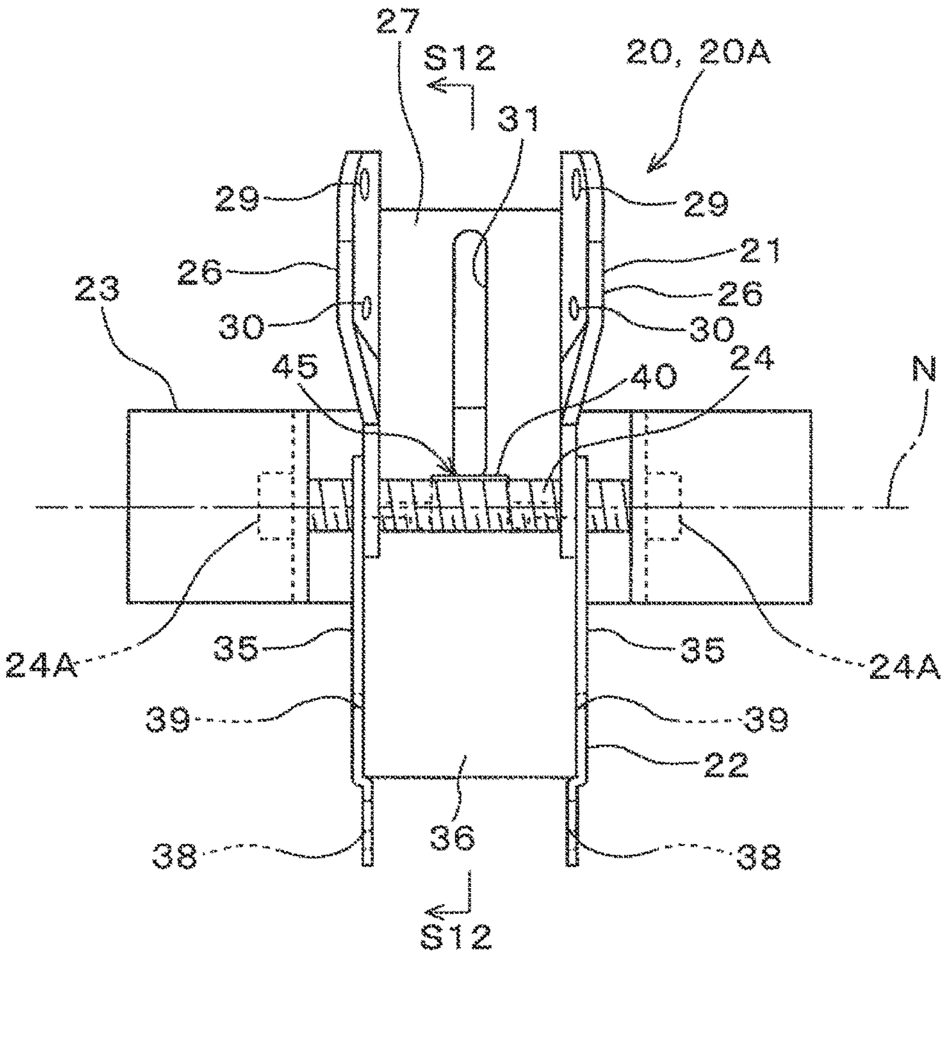
FIG. 11 is a side view showing the first connecting fitting when the first and second connecting members are in the state indicated by the solid lines in FIG. 10.

In a factory for manufacturing the door frame 2, the first connecting fitting 20A including the first connecting member 21, the second connecting member 22, the bearing member 23, and the central shaft 24 explained above is assembled into a structure shown in FIG. 10 (a front view of the first connecting fitting 20A) and FIG. 11 (a side view of the first connecting fitting 20A). This assembling is performed by, e.g., inserting the central shaft 24 as a common insertion member into the first holes 28 formed in the connecting parts 26 of the first connecting member 21 and the first holes 37 formed in the connecting parts 35 of the second connecting member 22, further inserting the central shaft 24 into the hat-shaped bearing member 23, and performing processing that forms the retaining portions 24A on the two end portions of the central shaft 24 in order to prevent removal from the bearing member 23.

Note that the central shaft 24 according to this embodiment is a male screw rod on the surface of which many projections and recesses are alternately formed in the axial direction by thread ridges and grooves.

Figure 12:
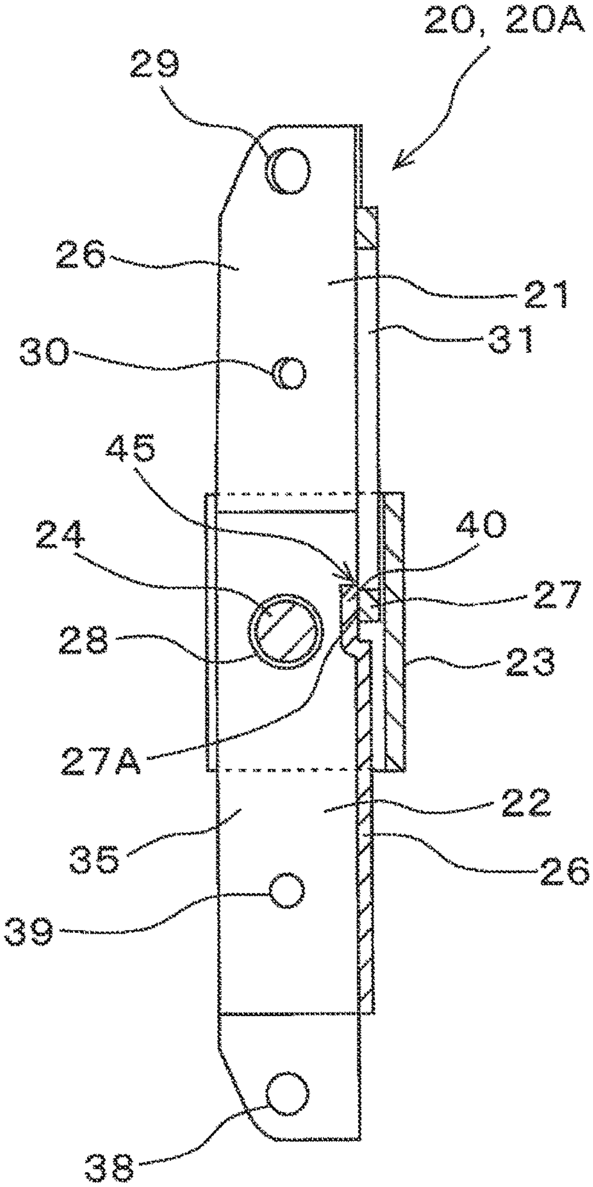
FIG. 12 is a sectional view taken along a line S12-S12 shown in FIG. 11.

FIG. 12 is a sectional view taken along a line S12-S12 shown in FIG. 11. FIG. 12 shows the sectional view of the first connecting fitting 20A assembled by the first connecting member 21, the second connecting member 22, the bearing member 23, and the central shaft 24 as described above. In the first connecting fitting 20A assembled in a factory, the projecting piece 40 formed in the second connecting member 22 is in contact with a rear surface 27A of the bridge part 27 formed in the first connecting member 21. Therefore, the first and second connecting members 21 and 22 for which the central shaft 24 is a common insertion member is connected by the central shaft 24. Also, the first and second connecting members 21 and 22 are parallel or almost parallel to each other in a direction perpendicular to the axial direction N of the central shaft 24.

Accordingly, the projecting piece 40 forms a parallelizing means 45 that aligns the first and second connecting members 21 and 22 in the direction perpendicular to the axial direction N of the central shaft 24 and makes first and second connecting members 21 and 22 parallel or almost parallel to each other. Also, as will be described later, when the first connecting fitting 20A is inserted into the gap between the door frame 2 shown in FIG. 3 and the auxiliary member 8 as a construction material of the wall, the parallelizing function of the parallelizing means 45 can align the first and second connecting members 21 and 22 in a direction (the vertical direction for the first connecting fitting 20A arranged in the side frame members 2A and 2B of the door frame 2, and the horizontal direction for the first connecting fitting 20A arranged in the upper frame member 2C of the door frame 2) perpendicular to the direction of the interval between the door frame 2 and the auxiliary member 8, and to the thickness direction of the door frame 2 (that is also the thickness direction of the wall 4 shown in FIGS. 1 and 2), thereby making the first and second connecting members 21 and 22 parallel or almost parallel to each other.

As shown in FIG. 4, in the factory having manufactured the door frame 2, the first connecting fitting 20A described above is attached to the door frame 2 by fixing the bearing member 23 to the left and right side frame members 2A and 2B and the upper frame member 2C of the door frame 2 by welding or the like. The second connecting fitting 20B shown in FIG. 3 includes the first connecting member 21, the bearing member 23, and the central shaft 24. Accordingly, the second connecting fitting 20B has a structure obtained by removing the second connecting member 22 from the first connecting fitting 20A. The second connecting fitting 20B as described above is also attached to the door frame 2 in the factory by fixing the bearing member 23 to the left and right side frame members 2A and 2B of the door frame 2.

The door frame 2 to which the first and second connecting fittings 20A and 20B are attached in the factory is transported to a construction site where the hinged door apparatus shown in FIG. 1 is to be installed. After that, before the face plates 6 (see FIG. 4) of the wall 4 (see FIG. 2) are attached to the core members 5, the first and second connecting fittings 20A and 20B are inserted into the horizontal interval between the auxiliary member 8 and the left and right side frame members 2A and 2B of the door frame 2, and the first connecting fitting 20A is inserted into the vertical interval between the auxiliary member 8 and the upper frame member 2C of the door frame 2. Consequently, the door frame 2 and the first and second connecting fittings 20A and 20B are arranged inside the opening 4A of the wall 4 shown in FIGS. 1 and 2. In this state, the auxiliary member 8 is attached to the reinforcing member 7 coupled with the core members 5A, 5B, and 5C (see FIG. 3), thereby forming the wall 4 shown in FIG. 2. Note that the work for attaching the auxiliary member 8 to the reinforcing member 7 is performed immediately before the work for arranging the door frame 2 and the first and second connecting fittings 20A and 20B inside the opening 4A of the wall 4 as described above.

In this embodiment, when performing the work for arranging the door frame 2 and the first and second connecting fittings 20A and 20B inside the opening 4A of the wall 4 as described above, for the first connecting fitting 20A, among the plurality of first connecting fittings 20A, which is inserted into the horizontal interval between the auxiliary member 8 and the side frame members 2A and 2B of the door frame 2, the parallelizing function of the parallelizing means 45 described above can make the first and second connecting members 21 and 22 parallel or almost parallel to each other while aligning the first and second connecting members 21 and 22 in the vertical direction perpendicular to the horizontal direction as the interval between the reinforcing member 7 and the side frame members 2A and 2B, and to the thickness direction of the door frame 2, even when the first and second connecting members 21 and 22 can pivot around the central shaft 24. Also, for the first connecting fitting 20A to be inserted into the vertical interval between the upper frame member 2C of the door frame 2 and the auxiliary member 8 attached to the reinforcing member 7 coupled with the core member 5C, the parallelizing function of the parallelizing means 45 can make the first and second connecting members 21 and 22 parallel or almost parallel to each other while aligning the first and second connecting members 21 and 22 in the horizontal direction perpendicular to the vertical direction as the interval between the upper frame member 2C and the reinforcing member 7, and to the thickness direction of the door frame 2.

As described above, therefore, even when the first and second connecting members 21 and 22 of the first connecting fitting 20A are pivotable around the central shaft 24, and the horizontal interval between the reinforcing member 7 and the side frame members 2A and 2B and the vertical interval between the upper frame member 2C and the reinforcing member 7 are small, the first connecting fitting 20A can effectively be inserted into these intervals. This insertion work can be performed by standing up only the first connecting member 21 of the second connecting fitting 20B around the central shaft 24 of the second connecting fitting 20B. Since a few workers can easily finish the insertion work within a short time period, the workability can be improved.

After inserting the plurality of first connecting fittings 20A into the horizontal interval between the auxiliary member 7 and the side frame members 2A and 2B and into the vertical interval between the upper frame member 2C and the reinforcing member 7 as described above, the worker performs the work for pivoting at least one of the first and second connecting members 21 and 22 of each of the first connecting fittings 20A toward the side frame members 2A and 2B or the opposite side of the upper frame member 2C around the central shaft 24 with respect to the other connecting member. This pivoting work can be performed by, e.g., inserting a tool or the like into the second and third holes 29 and 30 of the first connecting member 21 shown in FIGS. 7A, 7B, and 7D, and into the second and third holes 38 and 39 of the second connecting member 22 shown in FIGS. 9A and 9B.

Figure 13:
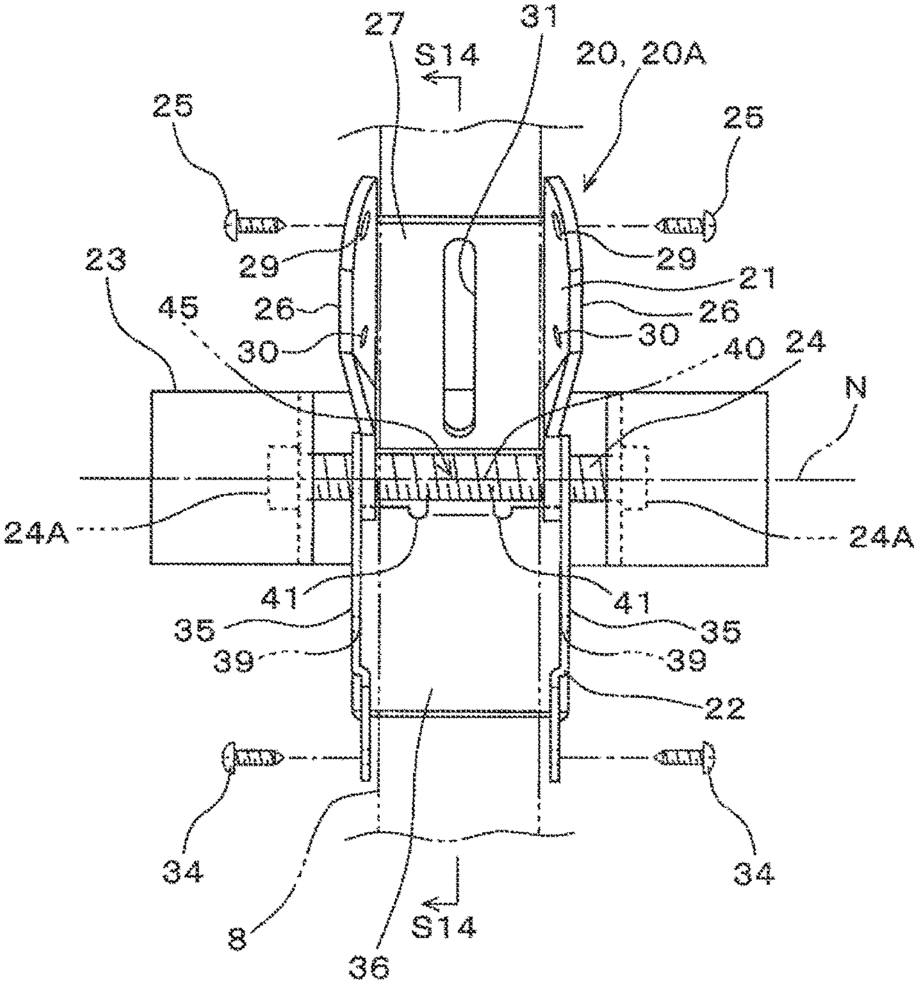
FIG. 13 is a side view showing the first connecting fitting when the first and second connecting members are dog-legged as shown in FIGS. 5 and 6.
Figure 14:
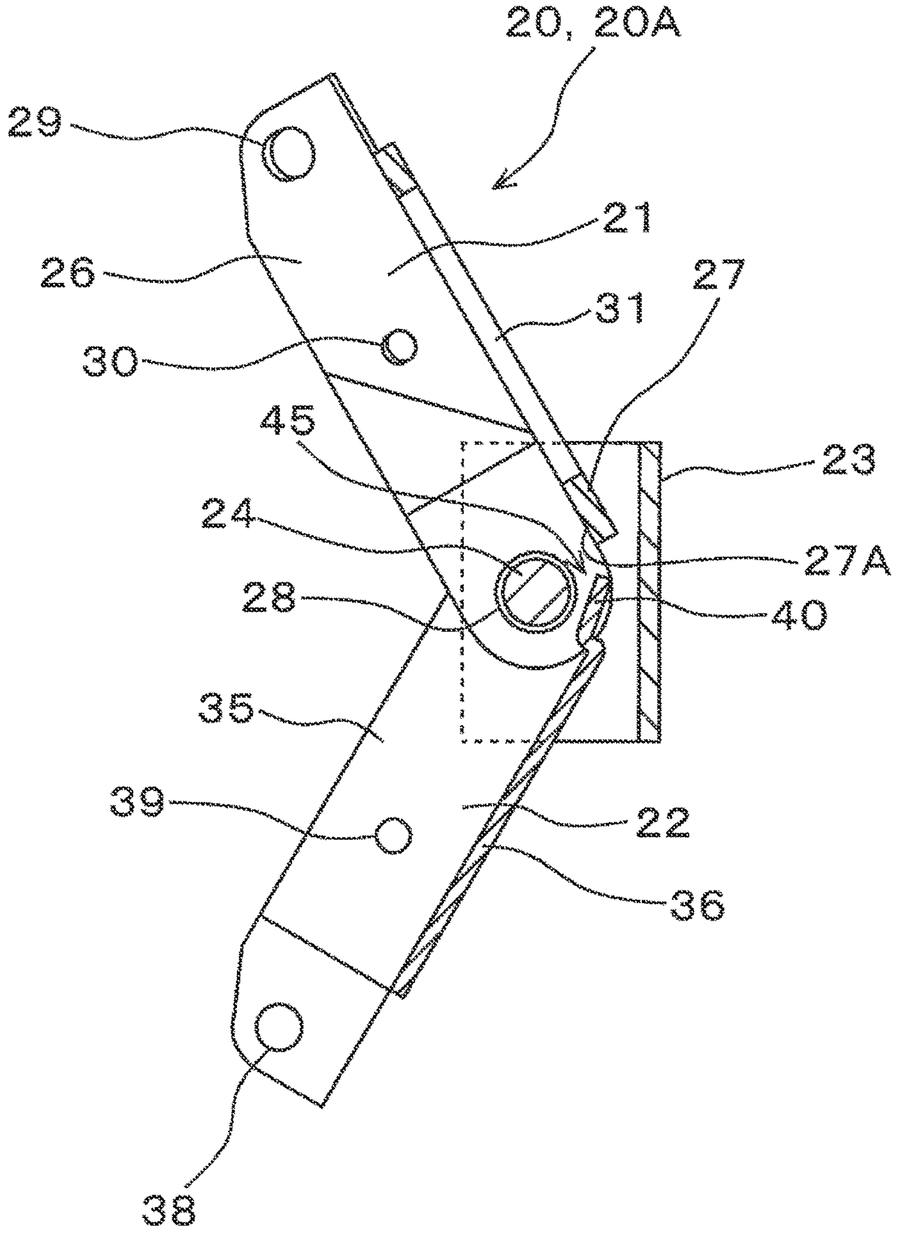
FIG. 14 is a sectional view taken along a line S14-S14 shown in FIG. 13.

FIG. 13 shows the side view of the first connecting fitting 20A after this pivoting work is performed. FIG. 14 is the sectional view of the first connecting fitting 20A taken along a line S14-S14 shown in FIG. 13. As shown in FIG. 14, when the above-described pivoting work is performed, the projecting piece 40 formed in the second connecting member 22 and in contact with the rear surface 27A of the bridge part 27 of the first connecting member 21 bends from the portion connected to the bridge part 36 of the second connecting member 22 due to the load of the pivoting work by the worker, and this eliminates the parallelizing function of the parallelizing means 45. Consequently, for the first connecting fitting 20A, among the plurality of connecting fittings 20A, which is inserted into the interval between the reinforcing member 7 and the side frame members 2A and 2B, the first and second connecting members 21 and 22 are pivoted around the central shaft 24, as indicated by the alternate long and two short dashed lines shown in FIG. 10, such that inclination angles θ1 and θ2 with respect to a horizontal direction M as the direction of the interval between the reinforcing member 7 and the side frame members 2A and 2B are angles in directions opposite to each other. This makes it possible to insert (see FIG. 15) the auxiliary member 8 between the end portions 26A and between the end portions 35A, on the side of the auxiliary member 8, of the two connecting parts 26 and 35 (see FIGS. 7A to 7D and FIG. 9B) of the first and second connecting members 21 and 22. Also, for the first connecting fitting 20A inserted into the interval between the upper frame work 2C and the auxiliary member 8, the first and second connecting members 21 and 22 are pivoted around the central shaft 24 such that inclination angles with respect to the vertical direction as the direction of the interval between the upper frame member 2C and the reinforcing member 7 are angles in directions opposite to each other. This makes it possible to insert the auxiliary member 8 between the end portions 26A and between the end portions 35A, on the side of the auxiliary member 8, of the two connecting parts 26 and 35 of the first and second connecting members 21 and 22.

In each first connecting fitting 20A, therefore, the first connecting member 21 forms an inclination angle with respect to the direction of the interval between the auxiliary member 8 and the side frame members 2A and 2B, and to the direction of the interval between the upper frame member 2C and the auxiliary member 8, and the second auxiliary member 22 forms an inclination angle in a direction opposite to that of the inclination angle of the first auxiliary member, with respect to the direction of the interval between the auxiliary member 8 and the side frame members 2A and 2B, and to the direction of the interval between the auxiliary member 8 and the upper frame member 2C.

Note that in the first connecting fittings 20A, the second connecting member 22 has the two notches 41 formed on the two sides of the projecting piece 40 of the second connecting member 22 as described above. Therefore, the worker can reliably bend the projecting piece 40 even when the load of the above-described pivoting work for bending the projecting piece 40 from the portion connected to the bridge part 36 of the second connecting member 22 is small.

Furthermore, in this embodiment, the central shaft 24 as the constituting member of the first connecting fitting 20A is an insertion member inserted into both the first and second connecting members 21 and 22 of the first connecting member 20A in order to make the first and second connecting members 21 and 22 pivotable. Accordingly, the number of members constituting the first connecting fitting 20A can be reduced compared to a case in which a central shaft for making each of the first and second connecting members 21 and 22 pivotable is used for each of the first and second connecting members 21 and 22. This makes it possible to simplify the structure and reduce the manufacturing cost.

Figure 15:
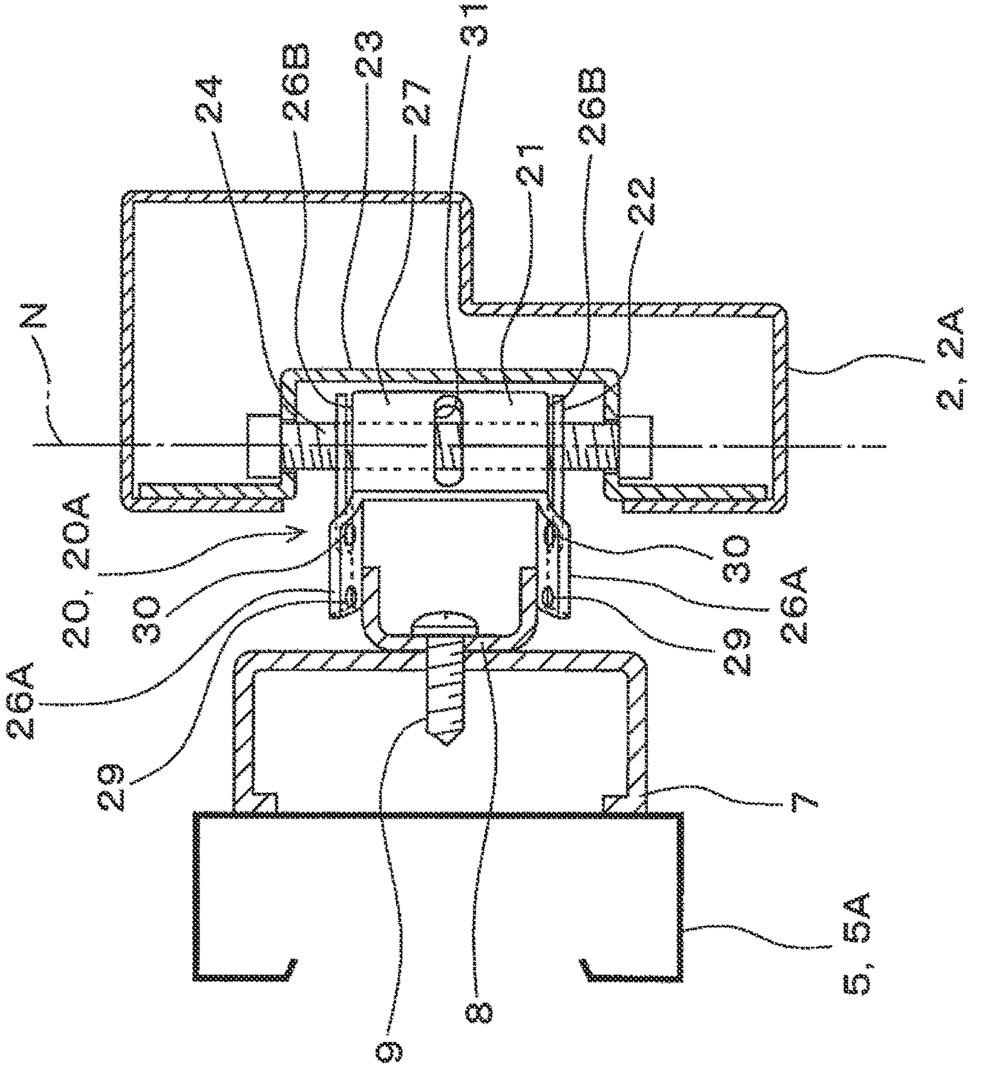
FIG. 15 is a view similar to FIG. 4, showing a state before the first and second connecting members are coupled with the auxiliary member attached to the reinforcing member shown in FIG. 4 by using coupling fittings.

FIG. 15 shows a state in which the auxiliary member 8 is inserted between the end portions 26A and between the end portions 35A, on the side of the auxiliary member 8, of the two connecting parts 26 and 35 in the first and second connecting members 21 and 22 of the first connecting fitting 20A as described above.

Figure 16:
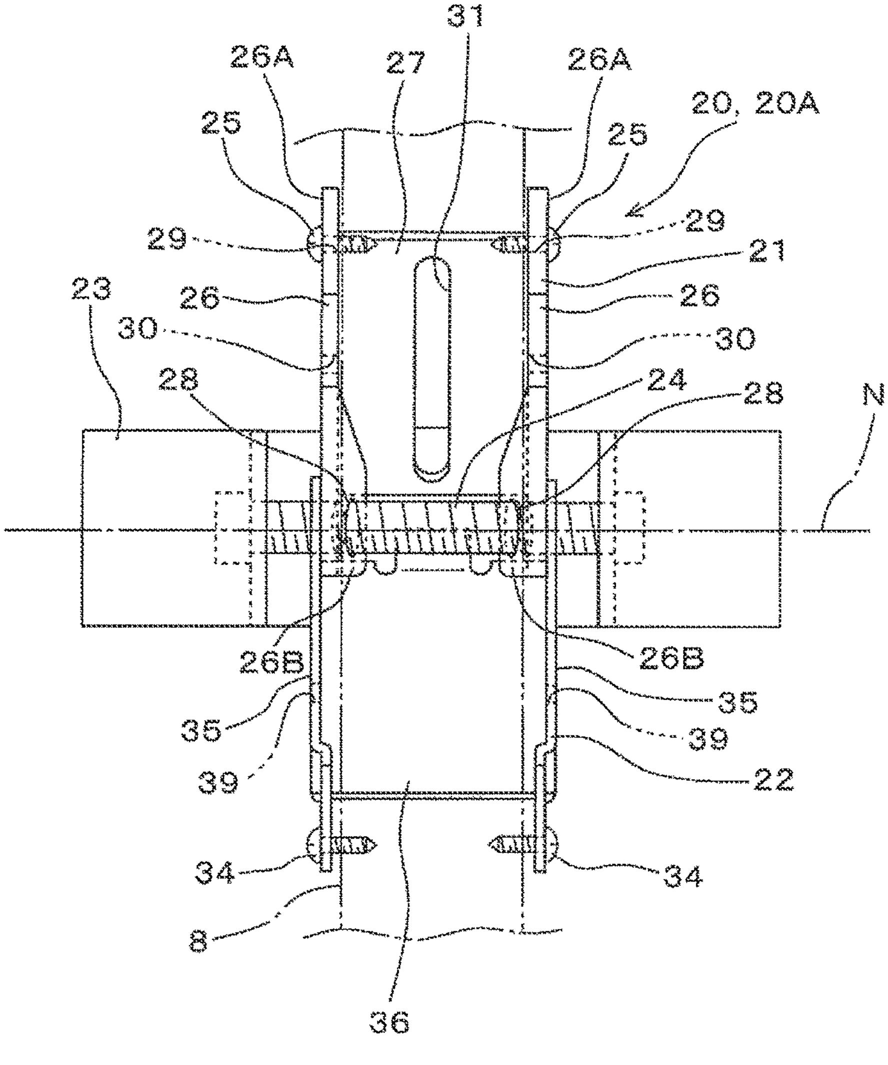
FIG. 16 is a view similar to FIG. 13, showing a state in which the first and second connecting members are coupled with the reinforcing member indicated by the alternate long and two short dashed lines by using the coupling fittings.
Figure 17:
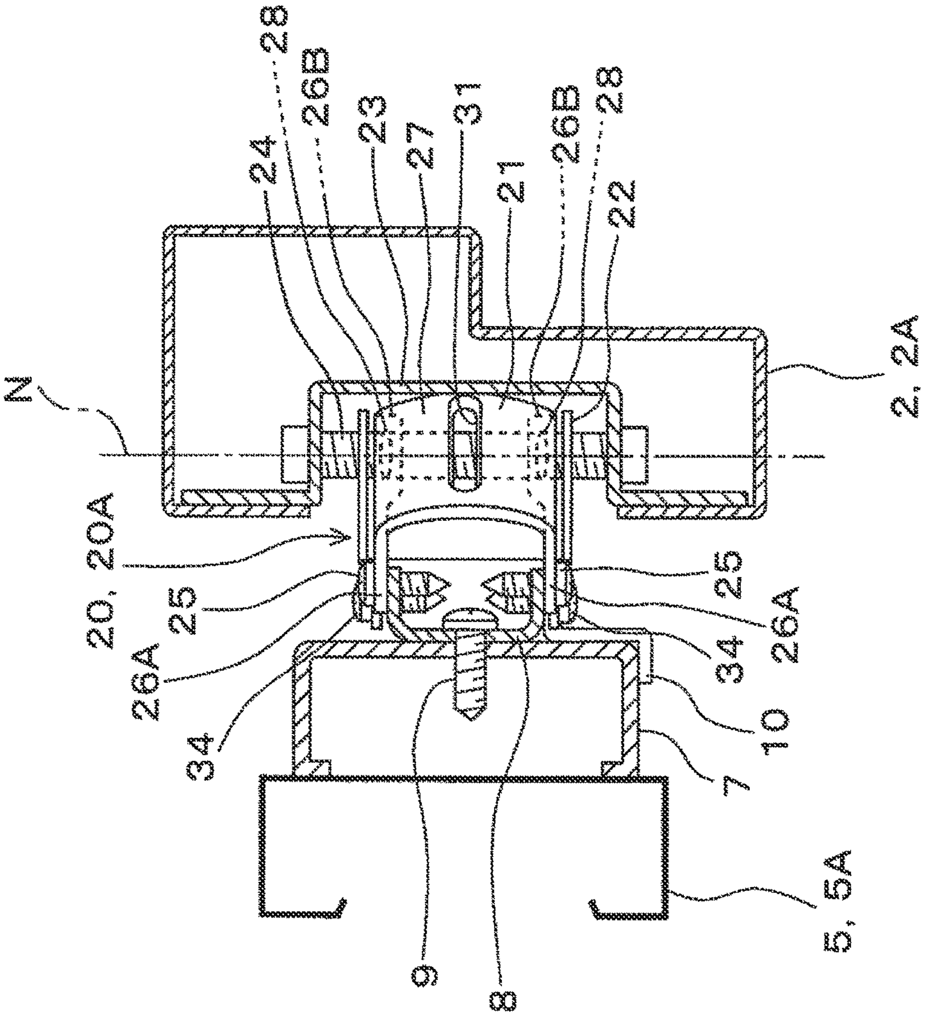
FIG. 17 is a view similar to FIG. 4, showing the state of FIG. 16.

After performing the above-described work, the worker inserts the two coupling fittings 25 (see FIGS. 4 and 13) into the second holes 29 (see FIGS. 7A, 7B, and 7C) formed in the connecting part 26 of the first connecting member 21 of the first connecting fitting 20A (see FIG. 3), and screws the two coupling fittings 25 into the auxiliary member 8, thereby coupling the end portion, on the side of the auxiliary member 8, of the first connecting member 21 with the auxiliary member 8 as shown in FIGS. 16 and 17. Also, the worker inserts the two coupling fittings 34 (see FIGS. 4 and 13) into the second holes 38 (see FIGS. 9A and 9B) formed in the connecting part 35 of the second connecting member 22 of the first connecting fitting 20A, and screws the two coupling fittings 34 into the auxiliary member 8, thereby coupling the end portion, on the side of the auxiliary member 8, of the second connecting member 22 with the auxiliary member 8 as shown in FIGS. 16 and 17.

Furthermore, for each of the two second connecting fittings 20B (see FIG. 3) arranged in the lowermost portions of the left and right side frame members 2A and 2B of the door frame 2, the worker pivots the first connecting member 21 around the central shaft 24, and makes the angle (see FIG. 10) of the first connecting member 21 in above-described horizontal direction M the same as or almost the same as the inclination angle θ1 of the first connecting member 21 of the first connecting fitting 20A described above, and couples the end portion, on the side of the auxiliary member 8, of the first connecting member 21 with the auxiliary member 8 by using the two coupling fittings 25.

Note that the second connecting fittings 20B are formed without using the second connecting member 22 because the second connecting fittings 20B can effectively be arranged in the lowermost portions of the left and right side frame members 2A and 2B by omitting the second connecting member 22 that is supposed to be arranged below the first connecting member 21.

When the coupling work for coupling the first and second connecting fittings 20A and 20B by using the coupling fittings 25 and 34 as described above, the door frame 2 is connected to the auxiliary member 8 via the two connecting portions 26 of the first connecting member 21 and the two connecting parts 35 of the second connecting member 22 of the plurality of first connecting fittings 20A, and connected to the auxiliary member 8 via the two connecting parts 35 of the first connecting member 21 of the two connecting fittings 20B. In this connecting work for connecting the door frame 2 to the auxiliary member 8, the first connecting fitting 20A inserted into the gap between the reinforcing member 7 and the side frame members 2A and 2B has a posture by which the inclination angle θ1 made by the first connecting member 21 in the horizontal direction M as the direction of the gap between the reinforcing member 7 and the side frame members 2A and 2B and the inclination angle θ2 made by the second connecting member 22 in the horizontal direction M are in opposite directions (see FIG. 10). The door frame 2 is connected to the auxiliary member 8 so as to be vertically immobile. Also, in the abovementioned connecting work, the first connecting fitting 20A inserted into the gap between the upper frame member 2C and the auxiliary member 8 has a posture by which the inclination angle made by the first connecting member 21 in the vertical direction as the direction of the gap between the upper frame member 2C and the reinforcing member 7 and the inclination angle made by the second connecting member 22 in the vertical direction are in opposite directions. Accordingly, the door frame 2 is connected to the auxiliary member 8 so as to be immobile in the horizontal direction as well.

Also, as shown in FIGS. 16 and 17, when the end portion (see FIGS. 4 and 13), on the side of the auxiliary member 8, of the first connecting member 21 of the first connecting fitting 20A is coupled with the auxiliary member 8 by the two coupling fittings 25 inserted into the second holes 29 (see FIGS. 7A, 7B, and 7D) formed in the connecting parts 26 of the first connecting member 21, the loads W from the coupling fittings 25 act on the end portions 26A, on the side of the auxiliary member 8, of the connecting parts 26 as explained above with reference to FIGS. 8A, 8B, and 8C. This action of the loads W reduces or eliminates the torsion angle (90°-α) having existed in the end portions 26A on the side of the auxiliary member 8, and generates the torsion angles (90°-β) in the end portions 26B, on the side of the door frame 2, as the end portions opposite to the end portions 26A as described previously.

Figure 18:
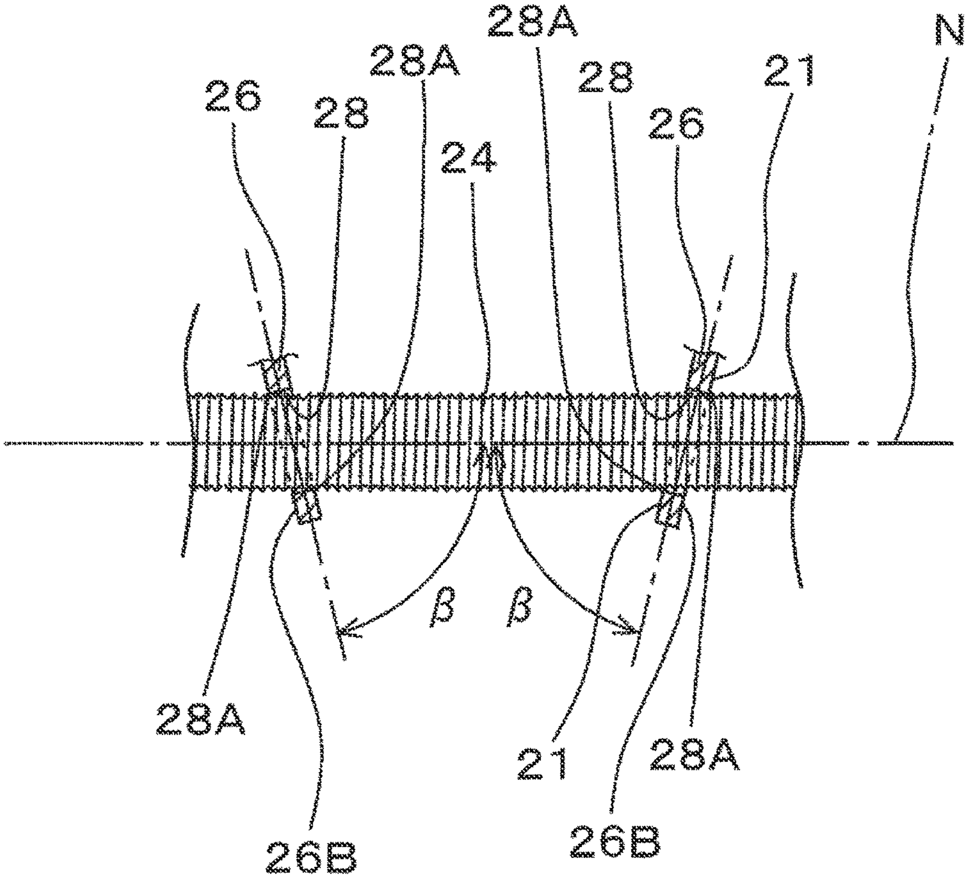
FIG. 18 is an enlarged sectional view showing a state in which the first connecting member of the first connecting fitting is locked by a central shaft as a locked member in the state shown in FIGS. 16 and 17.

FIG. 18 is an enlarged sectional view of the end portions 26B, on the side of the door frame 2, of the connecting parts 26 of the first connecting member 21, and shows that the torsion angles (90°-β) as described above form in the end portions 26B. As shown in FIG. 18, when the torsion angle (90°-β) forms in the end portion 26B, on the side of the door frame 2, of the connecting part 26 of the first connecting member 21, the torsion angle (90°-β) is an angle inclining to a direction perpendicular to the axial direction N of the central shaft 24, so the hole 28 formed as an insertion portion in the end portion 26B on the side of the door frame 2 in order to insert the central shaft 24 also inclines to the direction perpendicular to the axial direction N of the central shaft 24, and a corner 28A of the hole 28 locks on the surface of the central shaft 24. In other words, the central shaft 24 functions as a locked member on which the corner 28A of the hole 28 locks. This locking of the hole 28 onto the locked member makes the first connecting fitting 20A including the first connecting member 21 as a constituting member immobile in the thickness direction of the door frame 2 as the axial direction N of the central shaft 24. Therefore, the door frame 2 is connected to the auxiliary member 8 as a skeleton-side construction material so as to be immobile in the thickness direction of the door frame 2.

In particular, the central shaft 24 as the locked member of this embodiment is a male screw rod on the surface of which many projections and recesses are alternately formed in the axial direction by thread ridges and grooves, the corner 28A of the hole 28 locks on the surface of the central shaft 24 more reliably as described above. Consequently, the door frame 2 can be connected to the auxiliary member 8 such that the door frame 2 is immobile more reliably in the thickness direction of the door frame 2.

In this embodiment, the first and second connecting members 21 and 22 are coupled with the auxiliary member 8 by the coupling fittings 25 and 34 described above. The auxiliary member 8 is attached to the reinforcing member 7 by being set in a predetermined position in the thickness direction of the door frame 2 by the positioning member 10 shown in FIG. 4. Since, therefore, the corner 28A of the hole 28 locks on the surface of the central shaft 24, the door frame 2 is arranged by being set in the predetermined position in the thickness direction of the door frame 2.

In this embodiment as described above, when the load W (see FIGS. 8A and 8B) from the coupling fitting 25 shown in FIG. 4 acts on the end portion 26A, on the side of the auxiliary member 8, of each of the two connecting parts 26 of the first connecting member 21, the bridge part 27 formed in the first connecting member 21 deforms, e.g., curves in a direction projecting to the outside of the first connecting member 21, in the thickness direction of the bridge part 27, and this forms the torsion angle (90°-β) in the end portion 26B, on the side of the door frame 2, of the first connecting member 21, as described with reference to FIGS. 8A, 8B, and 8C. In this embodiment, the elongated hole 31 as a strength decreasing portion for decreasing the strength of the bridge part 27 is formed in the bridge part 27. Accordingly, the load W causes deformation, e.g., curving of the bridge part 27 more reliably, and this forms the torsion angle (90°-β) of the end portion 26B on the side of the door 2.

In the embodiment explained above, the end portions 26A and 35A, on the side of the auxiliary member 8, of the two connecting parts 26 and 35 of the first and second connecting members 21 and 22 of the first connecting fitting 20A are coupled with the auxiliary member 8 by the two coupling fittings 25 and the two coupling fittings 34. As shown in FIGS. 16 and 17, the coupling fittings 25 and 34 are arranged on the opposite sides in the axial direction N of the central shaft 24 with respect to the first and second connecting members 21 and 22, and couple the end portions 26A and 35A on the side of the auxiliary member 8 with the auxiliary member 8 in opposite directions in the axial direction N of the central shaft 24.

Figure 19:
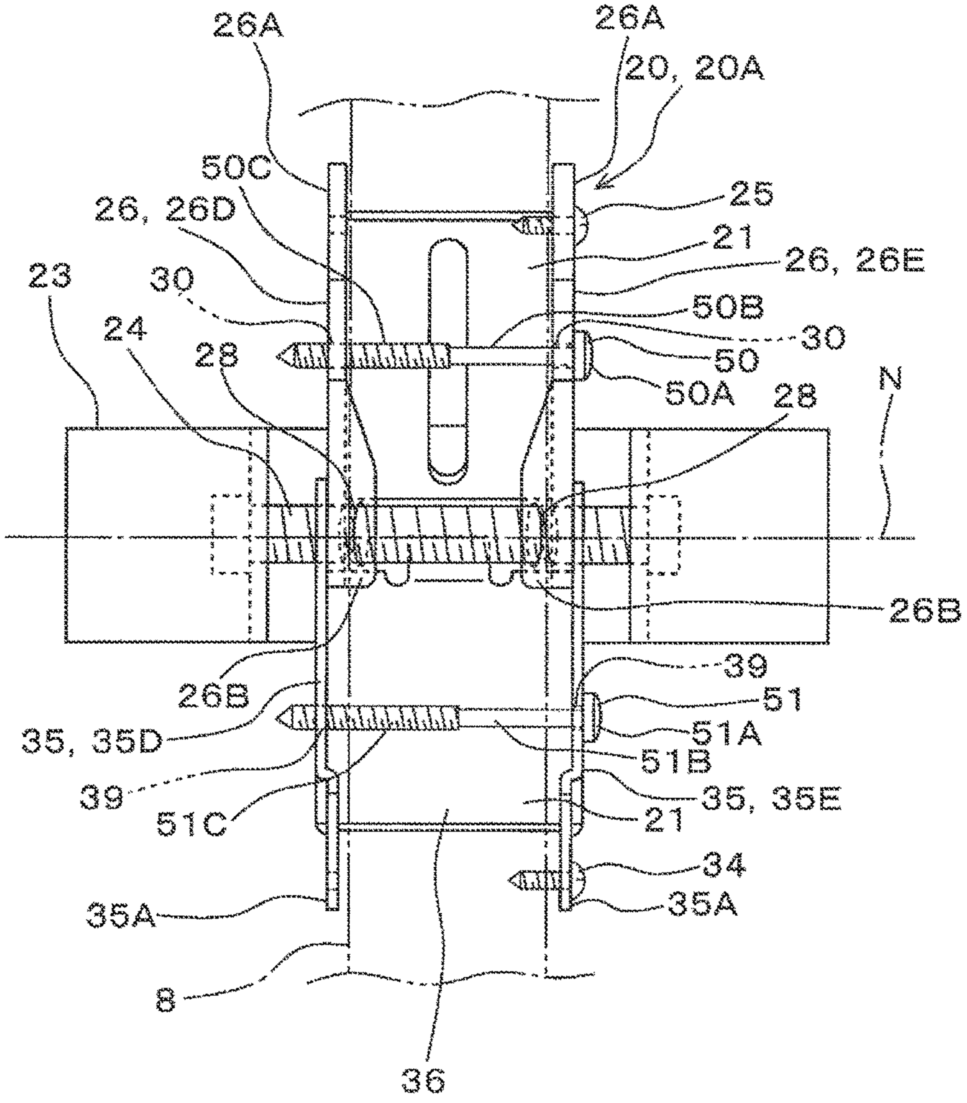
FIG. 19 is a view similar to FIG. 16, showing a state in which the first and second connecting members are coupled with the auxiliary member attached to the reinforcing member by using the coupling fittings arranged on the same side in the axial direction of the central shaft.
Figure 20:
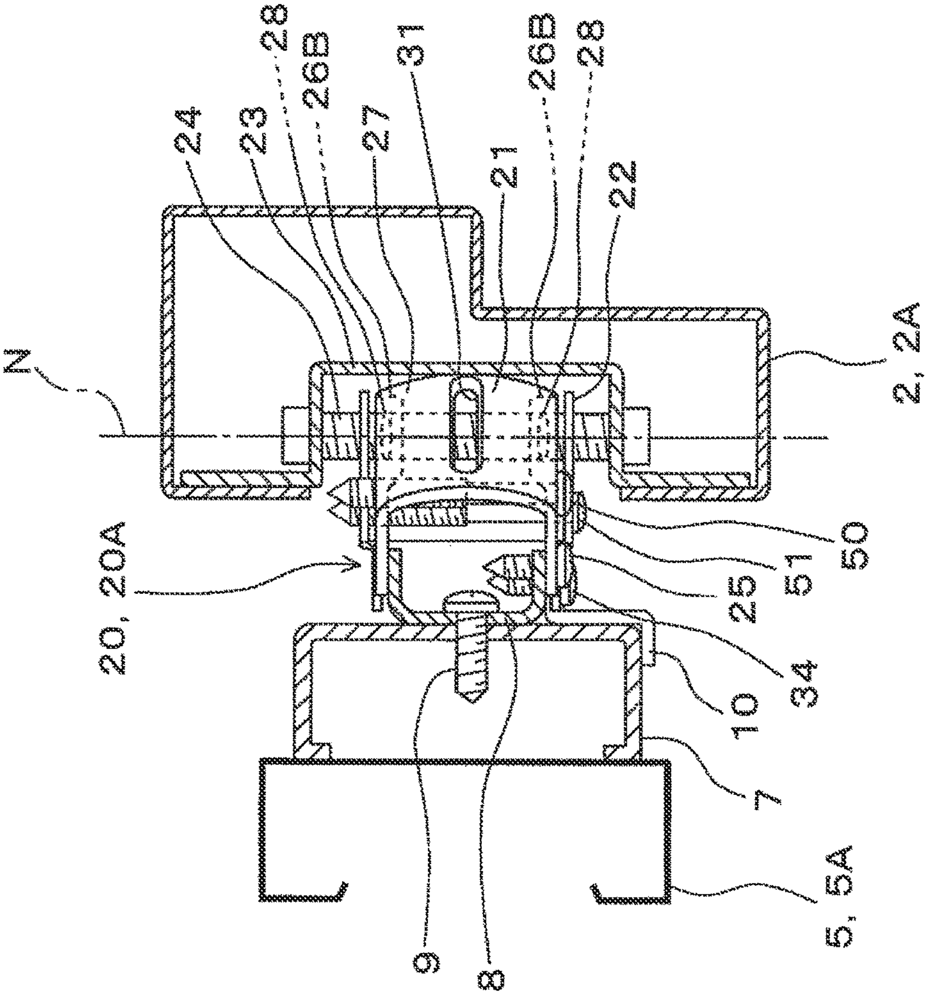
FIG. 20 is a view similar to FIG. 4, showing the state of FIG. 19.

On the other hand, another embodiment shown in FIGS. 19 and 20 uses one coupling fitting 25 and another coupling fitting 50 different from the coupling fitting 25, in order to couple end portions 26A, on the side of an auxiliary member 8, of two connecting parts 26 of a first connecting member 21 of a first connecting fitting 20A, with the auxiliary member 8. The coupling fittings 25 and 50 are arranged on the same side in an axial direction N of a central shaft 24 with respect to the first connecting member 21, and in the same direction along the axial direction N. As shown in FIG. 19, the coupling fitting 50 is a coupling fitting that is inserted into a connecting part 26D, of two connecting parts 26D and 26E, which is arranged on a side opposite to the side on which the coupling fittings 25 and 50 are arranged in the axial direction N of the central shaft 24, and draws the connecting part 26D toward the connecting part 26E. In addition, one coupling fitting 34 and another coupling fitting 51 different from the coupling fitting 34 are used to couple end portions 35A, on the side of the auxiliary member 8, of two connecting parts 35 of a second connecting member 22, with the auxiliary member 8. The coupling fittings 34 and 51 are also arranged on the same side in the axial direction N of the central shaft 24 with respect to the second connecting member 22, and in the same direction along the axial direction N. As shown in FIG. 19, the coupling fitting 51 is a coupling fitting that is inserted into a connecting part 35D, of two connecting parts 35, which is arranged on a side opposite to the side on which the coupling fittings 34 and 51 are arranged in the axial direction N of the central shaft 24, and draws the connecting part 35D toward a connecting part 35E.

As shown in, e.g., FIG. 19, the coupling fittings 50 and 51 are tapping screws including head portions 50A and 51A, small-diameter shaft portions 50B and 51B extending forward from the head portions 50A and 51A, and large-diameter male screw portions 50C and 51C extending forward from the small-diameter shaft portions 50B and 51B. The diameter of third holes 30 and 39 formed in the first and second connecting members 21 and 22 shown in FIGS. 7A to 7D and FIG. 9B is smaller than that of the large-diameter male screw portions 50C and 51C and larger than that of the small-diameter shaft portions 50B and 51B.

Accordingly, when the coupling fittings 50 and 51 are inserted into the third holes 30 and 39 of the connecting parts 26E and 35E, of the pair of connecting parts 26D and 26E and the pair of connecting parts 35D and 35E of the first and second connecting members 21 and 22, and advanced by being rotated by using a tool, female screws are formed on the inner surfaces of the third holes 30 and 39 by the large-diameter male screw portions 50C and 51C. When the coupling fittings 50 and 51 are further advanced by being rotated by using the tool, the large-diameter male screw portions 50C and 51C form female screws in the third holes 30 and 39 of the connecting parts 26D and 35D on the side opposite to the side on which the coupling fittings 25, 34, 50, and 51 are arranged in the axial direction N of the central shaft 24. In this state, the small-diameter shaft portions 50B and 51B of the coupling fittings 50 and 51 have reached the third holes 30 and 39 of the connecting parts 26E and 35E on the same side as the side on which the coupling fittings 25, 34, 50, and 51 are arranged, and the small-diameter shaft portions 50B and 51B are idling in the third holes 30 and 39. On the other hand, the large-diameter male screw portions 50C and 51C draw the connecting parts 26D and 35D on the side opposite to the side on which the coupling fittings 25, 34, 50, and 51 are arranged, toward the connecting parts 26E and 35E on the same side as the side on which the coupling fittings 25, 34, 50, and 51 are arranged.

Consequently, of the end portions 26A and 35A, on the side of the auxiliary member 8, of the two connecting parts 26 and the two connecting parts 35 of the first and second connecting members 21 and 22, the end portions 26A and 35A on the side opposite to the side on which the coupling fittings 25, 34, 50, and 51 are arranged are strongly pressed against the auxiliary member 8. This sets the end portions 26A and 35A in the same state as that when they are coupled with the auxiliary member 8.

In this embodiment, all the coupling fittings 25, 34, 50, and 51 for coupling the end portions 26A and 35A, on the side of the auxiliary member 8, of the connecting parts 26 and 35 of the first and second connecting members 21 and 22 of the first connecting fitting 20A, with the auxiliary member 8 can be arranged on the same side in the axial direction N of the central shaft 24. Therefore, the work for rotating and advancing the coupling fittings 25, 34, 50, and 51 by using a tool can be performed by a worker on the same side in the axial direction N of the central shaft 24. This makes it possible to facilitate the work, shorten the time of the work, and improve the workability of the work.

Note that in the embodiment shown in FIGS. 19 and 20, coupling fittings similar to the coupling fittings 25 and 50 are used to couple the end portions 26A, on the side of the auxiliary member 8, of the two connecting parts 26 of the first connecting member 21 forming the second connecting fitting 20B (see FIG. 3), with the auxiliary member 8.

In this embodiment, the third holes 30 are formed in the two connecting parts 26D and 26E of the first connecting member 21 of the first and second connecting fittings 20A and 20B. Also, the third holes 39 are formed in the two connecting parts 35D and 35E of the second connecting member 22 of the first connecting fitting 20A. Unlike the example shown in FIG. 19, therefore, the coupling fittings 25, 34, 50, and 51 can also be arranged on the side of the connecting part 26D of the first connecting member 21, and on the side of the connecting part 35D of the second connecting member 22. Accordingly, the side on which the coupling fittings 25, 34, 50, and 51 are arranged can freely be selected in accordance with the state of each installation site of the hinged door apparatus. In addition, the work for connecting the door frame 2 to the auxiliary member 8 of the wall 4 can be performed by arranging the coupling fittings 25, 34, 50, and 51 on the same side in the thickness direction of the door frame 2, for the first and second connecting fittings 20A and 20B to be arranged in the left and right side frame members 2A and 2B and the upper frame member 2C of the door frame 2 shown in FIG. 3.

Figure 21:
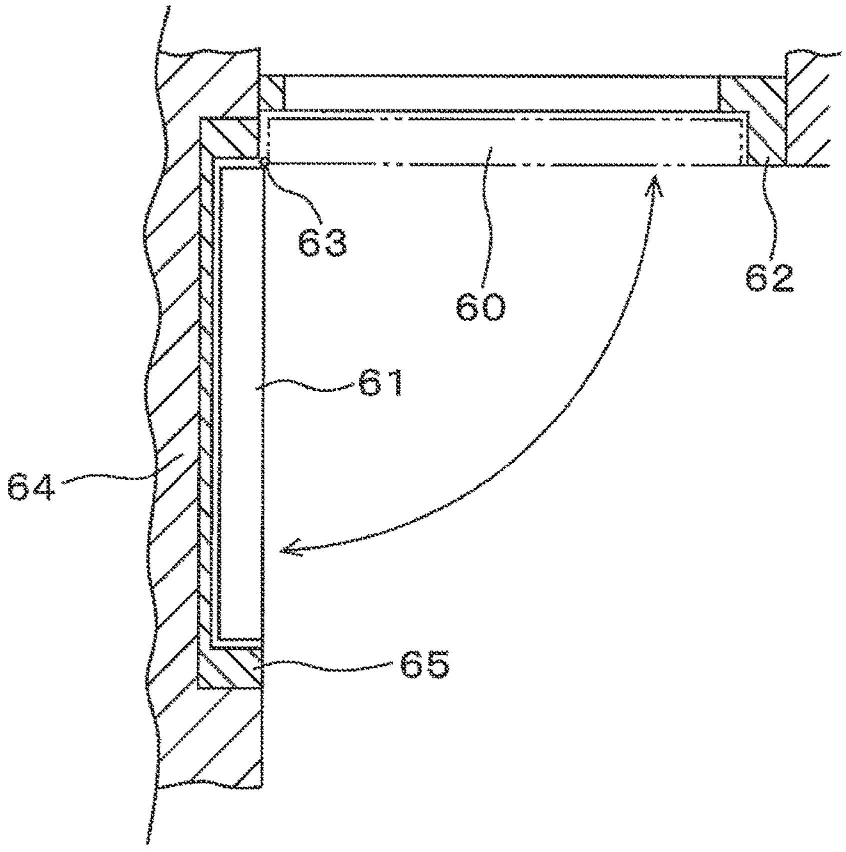
FIG. 21 is a plan sectional view showing the structure of a building to which the coupling fittings shown in FIGS. 19 and 20 are applicable.

FIG. 21 is a plan sectional view showing the structure of a building or the like in which it is effective to arrange all the coupling fittings 25, 34, 50, and 51 on the same side in the axial direction N of the central shaft 24 as explained with reference to FIGS. 19 and 20. In this structure, a fire door 61 that normally opens a doorway 60 inside a door frame 62 is openable/closable around a hinge 63 between the door frame 62 and a door case 65 for accommodating the closed fire door 61. The door case 65 is connected to a back wall 64 having a large thickness. The first and second connecting fittings 20A and 20B and the coupling fittings 25, 34, 50, and 51 shown in FIGS. 19 and 20 are used to connect the door case 65 to the back wall 64. Therefore, even in the structure in which one surface of the door case 65 in the thickness direction is covered with the wall 64, the work for connecting the door case 65 to the back wall 64 can effectively be performed by using the first and second connecting fittings 20A and 20B and the coupling fittings 25, 34, 50, and 51.

Figure 22A:
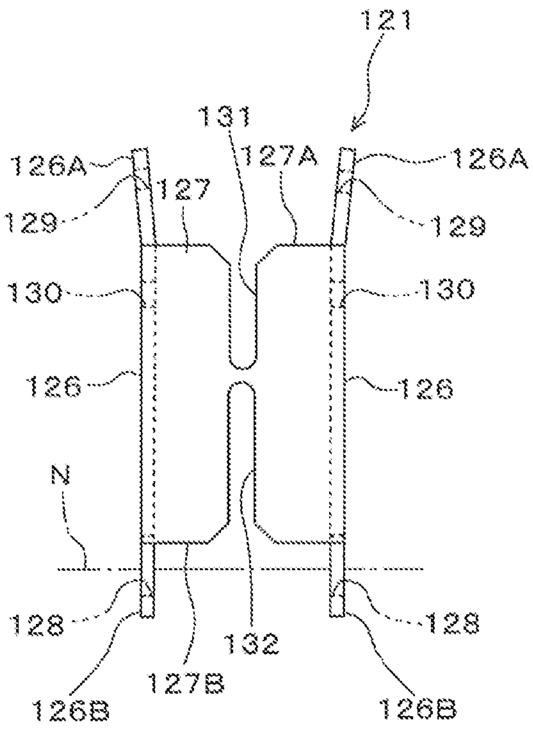
FIG. 22A is a side view showing a first connecting member according to another embodiment.
Figure 22B:
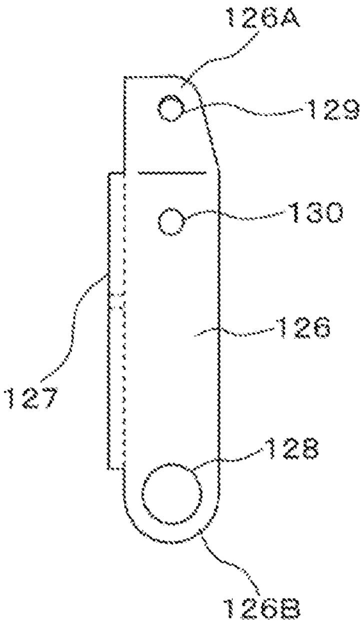
FIG. 22B is a rear view of FIG. 22A.

FIGS. 22A and 22B show a first connecting member 121 according to another embodiment. FIGS. 22A and 22B are respectively a side view and a rear view of the first connecting member 121. Like the first connecting member 21 shown in FIGS. 7A to 7D, the first connecting member 121 as a product obtained by punching and bending a metal plate includes two connecting parts 126 separated from each other in an axial direction N of a central shaft 24 and opposing each other, and a bridge part 127 is bridged between the end portions of the two connecting parts 126, in the thickness direction of the whole first connecting member 121 on the side perpendicular to the axial direction N of the central shaft 24. Therefore, the two connecting parts 126 are coupled with each other by the bridge part 127 for which the axial direction N of the central shaft 24 is the widthwise dimension. In addition, each connecting part 126 has a lengthwise dimension in a direction perpendicular to the axial direction N of the central shaft 24 and to the thickness direction of the whole first connecting member 121, and this lengthwise dimension is a dimension by which two end portions 126A and 126B in the longitudinal direction reach a door frame 2 and an auxiliary member 8 as the skeleton of a wall 4.

Also, in the first connecting member 121 of this embodiment, as shown in FIG. 22A, the end portion 126A on the side of the auxiliary member 8, of the two end portions 126A and 126B in the longitudinal direction of each connecting part 126, extends outward in the axial direction N of the central shaft 24 while extending outward in the longitudinal direction of the connecting part 126. Therefore, the two end portions 126A on the side of the auxiliary member 8 form an inverted V-shape that opens outward in the longitudinal direction of the connecting parts 126. On the other hand, the end portion 126B on the side of the door frame 2, of the two end portions 126A and 126B in the longitudinal direction of each connecting part 126, extends in the direction perpendicular to the axial direction N of the central shaft 24 while extending outward in the longitudinal direction of the connecting part 126, so the two end portions 126B of the door frame 2 are parallel to each other.

In addition, in each connecting part 126, a large-diameter first hole 128 is formed as an insertion portion for inserting the central shaft 24 in the end portion 126B on the side of the door frame 2, and a small-diameter second hole 129 for inserting the coupling fitting 25 shown in FIG. 4 is formed in the end portion 126A on the side of the auxiliary member 8. In each of the connecting parts 126, a third hole 130 is also formed for inserting a coupling fitting 50 as the tapping screw explained with reference to FIGS. 19 and 20 in a position shifted from the end portions 126A which form the inverted V-shape that opens outward in the longitudinal direction of the connecting parts 126.

Furthermore, the bridge part 127 include notches 131 and 132 cut inward in the longitudinal direction of the connecting parts 126 from end portions 127A and 127B of the bridge part 127 in the longitudinal direction of the connecting parts 126. The notches 131 and 132 function as strength decreasing portions formed in the bridge part 127 in order to decrease the strength of the bridge part 127.

Figure 23:
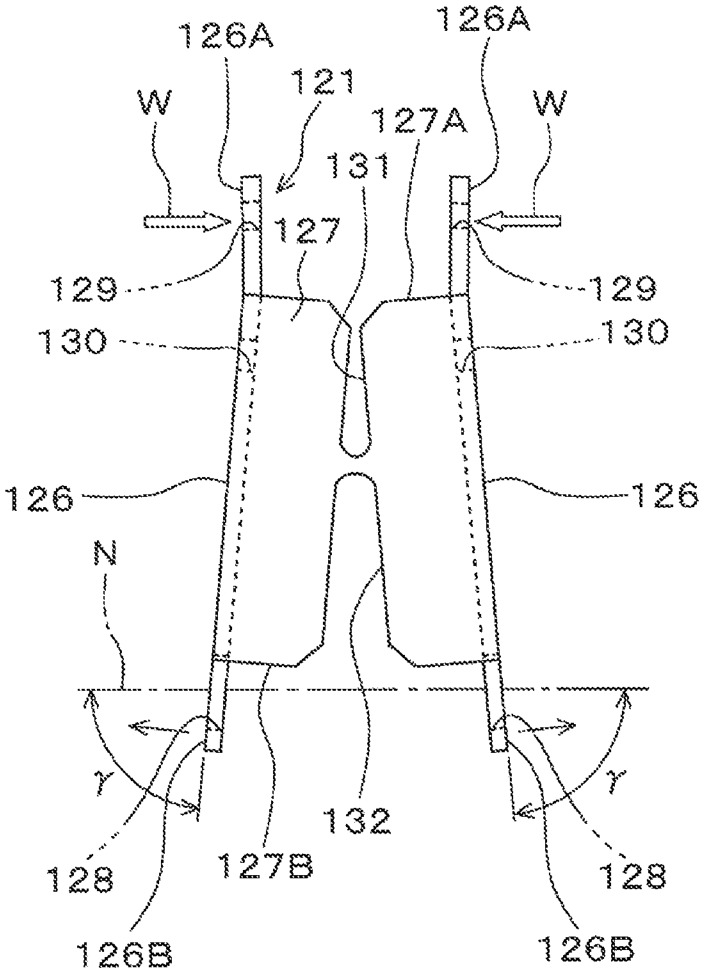
FIG. 23 is a side view showing a state in which loads for coupling the first connecting member shown in FIGS. 22A and 22B with the auxiliary member attached to the reinforcing member shown in FIG. 4 by using the coupling fittings act on the first connecting member.

FIG. 23 shows a state in which loads W in opposite directions in the axial direction N of the central shaft 24 act on the end portions 126A on the side of the auxiliary member 8 in order to couple the end portions 126A, on the side of the auxiliary member 8, of the connecting parts 126 with the auxiliary member 8 by using the coupling fitting 25 shown in FIG. 4 or the coupling fitting 50 shown in FIGS. 19 and 20. When the loads W act on the end portions 126A on the side of the auxiliary member 8, the end portions 126A on the side of the auxiliary member 8 become parallel to each other, and the end portions 126B of the door frame 2 form an inverted V-shape that opens outward in the longitudinal direction of the connecting parts 126 under the influence of the loads W. Consequently, the end portions 126B of the door frame 2 and the first holes 128 formed in the end portions 126B make inclination angles γ to the axial direction N of the central shaft 24.

Consequently, similar to the state shown in FIG. 18, the corner of the first hole 128 locks on projections and recesses formed by thread ridges and grooves formed on the surface of the central shaft 24, in the first connecting member 121 of this embodiment as well. This renders the first connecting member 121 immobile in the thickness direction of the door frame 2 as the axial direction N of the central shaft 24.

Also, in the first connecting member 121 of this embodiment, the notches 131 and 132 are formed as the strength decreasing portions in the bridge part 127. Therefore, when the above-described loads W act on the end portions 126A on the side of the auxiliary member 8, the end portions 126B of the door frame 2 and the first holes 128 formed in the end portions 126B make the inclination angles γ more reliably with respect to the axial direction N of the central shaft 24. This makes it possible to more reliably cause the corners of the first holes 128 to lock on the projections and recesses formed by the thread ridges and grooves formed on the surface of the central shaft 24.

The first connecting member 121 explained above can be used in the first and second connecting fittings 20A and 20B, instead of the first connecting member 21 described earlier. Accordingly, the parallelizing means 45 formed by the projecting piece 40 formed in the second connecting member 22 is also applicable to the first connecting member 121 shown in FIGS. 22A, 22B, and 23.

INDUSTRIAL APPLICABILITY

The present invention can be used to connect two construction materials spaced apart from each other, more specifically, to connect a construction material of a skeleton such as a wall to an apparatus-side construction material, e.g., an opening frame such as a door frame of a hinged door apparatus, a sliding door apparatus, or the like.

EXPLANATION OF THE REFERENCE NUMERALS AND SIGNS

1 . . . hinged door, 2 . . . door frame as construction material of hinged door apparatus, 2A, 2B . . . side frame member of door frame, 2C . . . upper frame member of door frame, 4 . . . wall as skeleton, 7 . . . reinforcing member as skeleton-side construction material, 8 . . . auxiliary member as skeleton-side construction material, 20, 20A, 20B . . . connecting fitting, 21, 121 . . . first connecting member, 22 . . . second connecting member, 23 . . . bearing member, 24 . . . central shaft, 25, 34, 50, 51 . . . coupling fitting, 26, 126 . . . connecting part, 26A, 126A . . . auxiliary-member-side end portion, 26B, 126B . . . door-frame-side end portion, 27 . . . bridge part, 40 . . . projecting piece, 41 . . . notch as strength decreasing portion, 45 . . . parallelizing means, M . . . horizontal direction as direction of interval, N . . . axial direction, 01, 02 . . . inclination angle.

The invention claimed is:

1. A connecting fitting for construction materials, which connects two construction materials arranged with an interval therebetween, the connecting fitting comprising:

a first connecting member and a second connecting member that are adapted to be inserted between the two construction materials, and function as members for connecting the two construction materials; and parallelizing means having a parallelizing function of aligning the first connecting member and the second connecting member in a first direction perpendicular to both a thickness direction of one of the two construction materials and a direction of the interval, and making the first connecting member and the second connecting member parallel or almost parallel to each other, wherein the parallelizing means can eliminate the parallelizing function by a load caused to act on at least one of the first connecting member and the second connecting member, inclination angles, with respect to the direction of the interval, of the first connecting member and the second connecting member aligned parallel or almost parallel to each other in the first direction by the parallelizing means can be made opposite to each other by the elimination of the parallelizing function, and one of two end portions of each of the first connecting member and the second connecting member which are on a side of the other one of the two construction materials are adapted to be coupled with the other one of the two construction materials by coupling fittings.

2. The connecting fitting for construction materials according to claim 1, further comprising a central shaft that is inserted into the other one of the two end portions of each of the first connecting member and the second connecting member, and has an axial direction in the thickness direction of the one construction material, wherein the first connecting member and the second connecting member can pivot around the central shaft.

3. The connecting fitting for construction materials according to claim 2, wherein the central shaft is a central shaft common to the first connecting member and the second connecting member.

4. The connecting fitting for construction materials according to claim 2, wherein the parallelizing means includes a projecting piece that is formed in at least one of the first connecting member and the second connecting member and comes in contact with the other connecting member by projecting toward the other connecting member, the projecting piece can be bent by the load, and the parallelizing function of the parallelizing means disappears when the projecting piece is bent.

5. The connecting fitting for construction materials according to claim 4, wherein the one connecting member includes a strength decreasing portion having low strength in a portion near the projecting piece, and the projecting piece can be bent by a small load due to the strength decreasing portion.

6. The connecting fitting for construction materials according to claim 5, wherein the strength decreasing portion includes a notch formed in the one connecting member.

7. The connecting fitting for construction materials according to claim 5, wherein the strength decreasing portion includes two strength decreasing portions formed on both sides of the projecting piece.

8. The connecting fitting for construction materials according to claim 4, wherein the projecting piece is formed by bending from at least one of the first connecting member and the second connecting member to the inside of the other connecting member in the thickness direction.

9. The connecting fitting for construction materials according to claim 4, wherein the projecting piece provided on at least one of the first connecting member and the second connecting member is in contact with the other one of the first connecting member and the second connecting member to make the first connecting member and the second connecting member aligned parallel or almost parallel to each other.

10. The connecting fitting for construction materials according to claim 2, further comprising a bearing member supporting the central shaft, the bearing member configured to be attachable to the one of the two construction materials, wherein the central shaft is attached to the one of the one of the two construction materials via the bearing member.

11. The connecting fitting for construction materials according to claim 3, further comprising a bearing member supporting the central shaft, the bearing member configured to be attachable to the one of the two construction materials, wherein the central shaft is attached to the one of the one of the two construction materials via the bearing member.

12. The connecting fitting for construction materials according to claim 10, wherein the bearing member is formed into the shape of a hat.

13. The connecting fitting for construction materials according to claim 11, wherein the bearing member is formed into the shape of a hat.

* * * * *